(12) United States Patent
Henrion

(10) Patent No.: US 6,629,221 B2
(45) Date of Patent: Sep. 30, 2003

(54) MEMORY MANAGEMENT SYSTEM FOR ENABLING WRITING OF DATA BLOCKS BY SUBSTITUTION AND PREVENTING PREMATURE ELIMINATION OF DATA BLOCKS

(75) Inventor: Michel Henrion, Boulogne-Billancourt (FR)

(73) Assignee: Alcatel, Paris (FR)

( * ) Notice: Subject to any disclaimer, the term of this patent is extended or adjusted under 35 U.S.C. 154(b) by 178 days.

(21) Appl. No.: 09/895,266

(22) Filed: Jul. 2, 2001

(65) Prior Publication Data

US 2002/0019916 A1 Feb. 14, 2002

(30) Foreign Application Priority Data

Jul. 17, 2000 (FR) ............................................ 00 09302

(51) Int. Cl.[7] .............................................. G06F 13/00
(52) U.S. Cl. ........................................ 711/159; 711/165
(58) Field of Search .................................. 711/159, 165

(56) References Cited

U.S. PATENT DOCUMENTS 6,490,683 B1 * 12/2002 Yamada et al. .............. 713/176

2003/0002580 A1 * 1/2003 Miura et al. ............ 375/240.02

FOREIGN PATENT DOCUMENTS

FR   2 752 632   2/1998

* cited by examiner

*Primary Examiner*—Reba I. Elmore
(74) *Attorney, Agent, or Firm*—Sughrue Mion, PLLC

(57) ABSTRACT

The management system is associated with a buffer memory used to store data blocks (BD), each BD belonging to a given category. In addition to operations of receiving and servicing the BD, the system controls premature elimination of a given BD or of a BD belonging to a given category, freeing of its location in the buffer memory and temporary preservation of its associated block identifier to prevent any rearrangement of the time relations between blocks. Category marking management units and BDs cleared for elimination management unit store, for each BD, the category to which it belongs and, for each category, the list of the BDs cleared for elimination belonging to that category. The elimination management unit add, in the event of reception of a BD, a new BD to the list of BDs cleared for elimination that corresponds to the priority category of the new block and delete a BD from the list of BDs cleared for elimination, either in the event of the last service of a BD that has not already been eliminated or in the event of premature elimination of a given BD, or in the event of elimination of a BD cleared for elimination in a specified priority category.

14 Claims, 17 Drawing Sheets

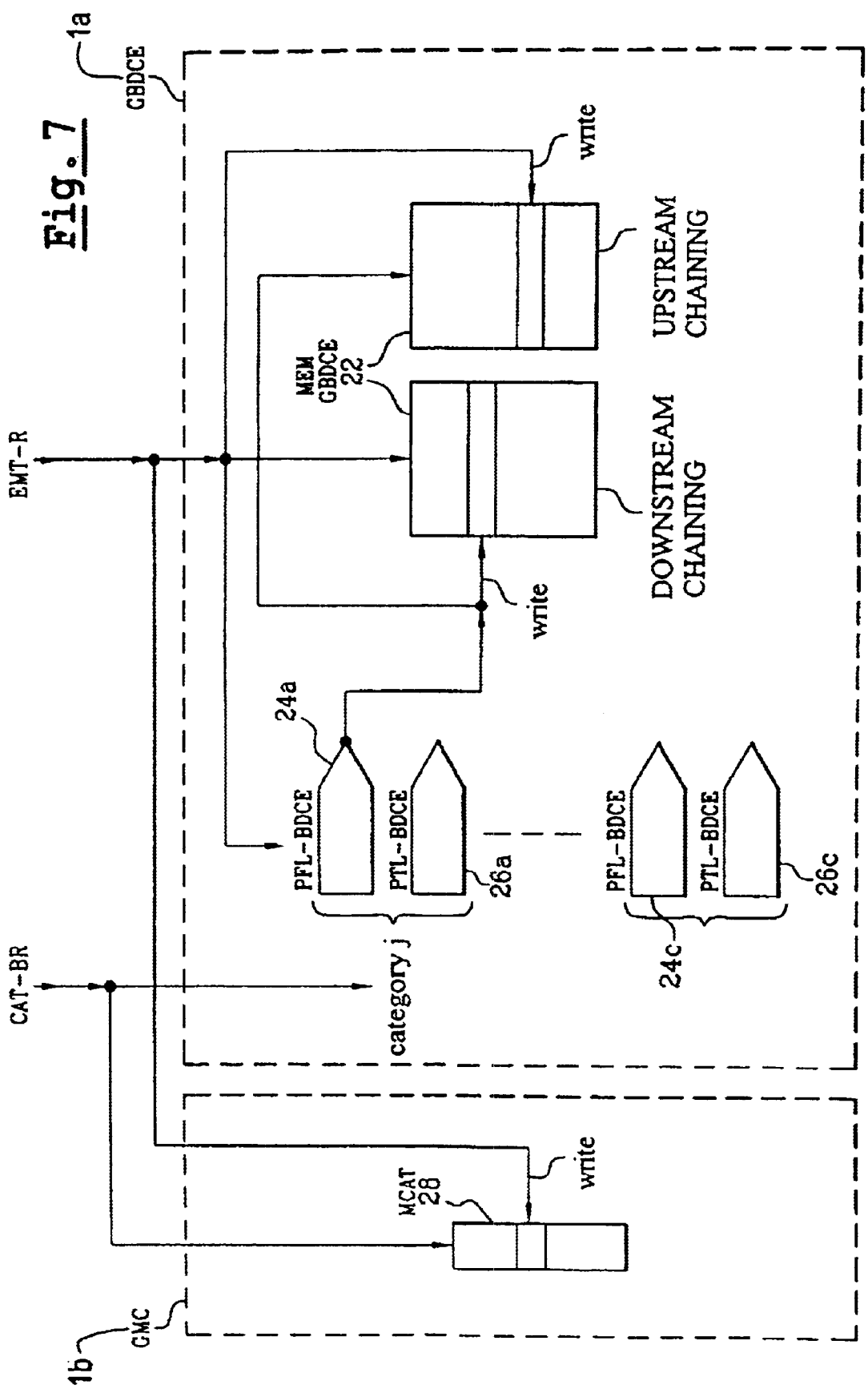

MEMORY MANAGEMENT SYSTEM FOR ENABLING WRITING OF DATA BLOCKS BY SUBSTITUTION AND PREVENTING PREMATURE ELIMINATION OF DATA BLOCKS

BACKGROUND OF THE INVENTION

The present invention relates to a buffer memory management system including a set of memory locations, each location temporarily storing a data block (BD) at a respective location address, said system avoiding rearrangement in the event of premature elimination of a data block stored in the memory. The problem of rearrangement following premature elimination of a data block relates to the consequences of that elimination, namely the need to modify the arrangement of the sequential relations between BDs in the management system. This problem is addressed in a previous patent application of the applicant, published under the number FR 2 752 632. The entirety of that application is considered to be incorporated into the present application by reference.

The present invention addresses more particularly the more specific problem of managing locations of a buffer memory when the stored data blocks are managed in accordance with n priority categories (where n is greater than 1), for example hierarchically in categories that reflect the respective priority levels of the various data blocks, and when a data block loss control discipline is used that implies an operation of writing a new data block into a location already occupied by another data block. If the memory is saturated, or filled to a level close to saturation (whether globally or for a given category), that operation typically consists of writing a new data block which has a high priority into a buffer memory location made available by eliminating from it the data block stored in that location, which is generally of lower priority.

This combined operation of eliminating a stored data block and simultaneously writing another data block in the same buffer memory location is referred to hereinafter as "substitution"; it is also known in the art as "push-out". Data blocks that can be eliminated are referred to hereinafter as "data blocks cleared for elimination" (BDCE). They are typically data blocks of n−1 lower priority categories (data blocks of the highest category cannot be eliminated).

Apart from the situation of eliminating a data block during a substitution operation, the invention also encompasses two other possible situations of premature elimination (without substitution) of a data block (referred to hereinafter as "BD"):

1.) eliminating a cleared for elimination BD in a given category i, typically the BD that is the first in a list used to manage the subset of BDs cleared for elimination (BDCE) of that category i; and 2.) eliminating a particular BD stored in a buffer memory location.

According to the solution proposed in the aforementioned patent application, each BD stored in the buffer memory is associated with a BD identifier (IBD), which can be different from the address (EMT) of its location in the buffer memory, and a BD is eliminated from a location of the buffer memory (EMT) without it being necessary to rearrange the sequential relations between BDs, which are managed by means of their respective BD identifiers (IBD). This is because eliminating a BD immediately frees the buffer memory location (EMT) that it was previously occupying but retains its original data block identifier (IBD). A BD that has been eliminated therefore continues to exist in the management system through its identifier IBD, for example in a chained list, but that identifier IBD is associated with an eliminated BD flag that is detected subsequently when the BD is serviced.

Accordingly, the situation envisaged in the aforementioned patent application is that of premature elimination of a given BD stored in a buffer memory effected as an isolated operation. There may be various causes for isolated elimination of a BD: creation ahead of time of new free locations for possible high-priority BD (typically in the event of imminent saturation of the buffer memory), elimination of an incorrect BD, etc.

Generally speaking, in the buffer memory management system described in the aforementioned patent application, when a BD is eliminated, the memory location (EMT) that it occupies is immediately released so that it become available, but the identifier IBD associated with the BD eliminated in this way is retained, so that the arrangement of the sequential relations between BDs (referenced by their identifier IBD) is not prematurely modified in the management system.

To achieve this technical effect, the management system according to the patent application previously cited includes:

a) free buffer memory location address management means for finding a free location on receiving a new data block to be stored in the buffer memory and for freeing the address of a location when it is no longer occupied by a data block;

b.) write control means for writing a new data block into a location of the buffer memory;

c.) free block identifier management means for assigning a free block identifier to each new data block stored in the buffer memory;

d.) location/block identifier association management means for storing, for each identifier associated with a data block, the address of the location that it occupies in the buffer memory; and e.) time management means in respect of data blocks stored in the buffer memory, for:
  commanding the reception of a new data block to be stored in the buffer memory;
  using a given service discipline, arranging the identifiers of the data blocks stored in the buffer memory by managing, as a function of time parameters associated with the identifiers of the blocks, their respective waiting times in the buffer memory and thereby determining respective read times for their service, each data block having normally to be read a predetermined number of times before freeing its location in the buffer memory and its associated block identifier;
  commanding service of a data block to be read in the buffer memory; and
  possibly commanding premature elimination of a predetermined stored data block, freeing of its location in the buffer memory and temporary preservation of its associated block identifier to prevent rearrangement of time relations between blocks.

To enable premature elimination of a data block stored in a buffer memory location and the immediate release of that location without having to rearrange the block identifiers managed by the time management means, the management system further includes:

a.) elimination flag management means for storing, for each data block identifier, an elimination flag indicating whether the corresponding block has been prematurely eliminated or not;

b.) means for commanding the free location address management means to free the address of the location storing a block to be eliminated;

c.) means for writing into the elimination flag management memory, each time that a block has been eliminated, a flag value storing the elimination of the block;

d.) means for reading the elimination flag management memory in the event of each selection of a block identifier, in order to read that block in the buffer memory, and for authorizing reading the buffer memory location corresponding to the selected block identifier only if the elimination flag that has been read indicates that the block having that block identifier has not already been eliminated; and e.) means for authorizing the free location address management means to free the address of the location corresponding to a block that has been read after that block has been read a predetermined number of times and for as long as reading is authorized, if that block has not already been eliminated.

With the above management system, it is possible to release a buffer memory location at the earliest possible time because the time management means include means for commanding the free location address management means to free prematurely the address of the location storing the block to be eliminated, as soon as the decision is taken to eliminate that block. The time management means do not rearrange the time parameters when a data block is eliminated, however. They therefore normally select the identifiers of the blocks eliminated without distinguishing them from those of other data blocks. Means are provided for reading elimination flags in the buffer memory to find out if a block identifier designates a block that is still stored. This system does not require any increase in the capacity of the buffer memory.

The aforementioned patent application can therefore be considered to provide a basis for an effective technique for eliminating a given BD stored in the buffer memory without rearranging the sequential relations between BDs (referenced by their identifier IBD) in the management system.

SUMMARY OF THE INVENTION

An object of the present invention is to develop the buffer memory management system of the aforementioned patent application in order to retain the same advantages in the particular context where each BD belongs to a category, for example a category reflecting a hierarchical priority level, and when a BD cleared for elimination in a given priority category can be eliminated (as opposed to eliminating a given BD); this kind of elimination operation can be effected in combination with the simultaneous writing of another BD in the same location in the buffer memory because that location has been freed (BD substitution operation). Also, this kind of elimination operation (of a BD cleared for elimination in a given priority category) can equally be effected in isolation.

A BD substitution operation will be considered in a general context, independently of the algorithm used to decide when and in which category this kind of elimination operation is required, and therefore in accordance with any block loss discipline, for example, subject only to the hypothesis that the substitution may be required on receiving a new block to be written in the buffer memory. In other words, a new block received is written:

a.) either normally (without substitution) in a free location of the buffer memory or b.) by substitution in the buffer memory location previously occupied by the BD eliminated in this substitution operation.

A substitution operation is typically effected in the event of congestion of the buffer memory, i.e. if it is necessary to write a new BD of high priority when no location is available in the buffer memory (whether globally or in the portion of the buffer memory assigned to the priority category of the received new BD). However, some BD loss control disciplines also effect substitution operations ahead of time, even if the buffer memory is not yet completely occupied.

Receiving a BD with substitution therefore necessitates executing in combination, and as fast as for normal reception:

a.) on the one hand, a BD elimination operation consequent upon the previous selection of a BD cleared for elimination in the required priority category (typically corresponding to a priority level lower than that of the received new BD), and b.) on the other hand, an operation of writing the received new BD in the buffer memory location freed by that elimination (as opposed to a free location in the case of normal BD reception without substitution).

In the above context, the buffer memory management system in accordance with the invention implies, for each category (except the highest category in some applications), managing the BDs stored that belong to the corresponding category and are therefore BDs cleared for elimination, knowing that a block can belong to only one category in the buffer memory.

The management of blocks cleared for elimination is considered in relation to a general substitution operation. In the simplest priority management applications, there are only two BD priority categories (high-priority and low-priority), and there is provision only for the possible elimination of low-priority BDs, in which case it is sufficient to manage a single category of BD cleared for elimination, namely the low-priority BDs. However, the general case will be assumed here, i.e. a plurality of priority categories (n>=2), in which case the management system is capable of managing a number C of subsets of BDs cleared for elimination, typically relating to C=n−1 priority categories (in most loss disciplines used, the higher priority BDs cannot be eliminated by a substitution operation); however, the situation C=n is equally possible.

Of the n possible priority categories, the indices i and j designate the two categories generally involved in a substitution operation.

Accordingly, in the event of a substitution operation, the BD loss control discipline (which is in itself outside the scope of the invention) determines the required priority category i (from the C subsets of BDs cleared for elimination) in order to effect the elimination. The management system is then informed of that category i, in which it must select a BD cleared for elimination, referred to hereinafter as a BDCE, and the priority category j of the received new BD.

To illustrate the management of BDCE in the event of a substitution operation in the management system in accordance with the invention, note that the latter system, a. on the one hand, regarding instructions from the BD discipline of the time management means, eliminates a BDCE in the required category i, and b. on the other hand, takes charge of the received new BD, which belongs to the priority category j and can belong to the highest priority category or another priority category, in which case the received new BD constitutes a new BDCE, which must be added to the subset of BDCE of category j.

Within the function of managing BDCE by category, it is therefore necessary, in the event of BD reception with substitution, a. on the one hand, to eliminate the BDCE selected for elimination in category i, and b. on the other hand, possibly to add the received new BD as a BDCE in category j (typically if its priority level j is not the highest level).

Conventionally, j @ i when a BD of higher priority replaces a block of lower priority. However, the situation j=i is not excluded in some sophisticated BD loss disciplines.

For managing the various situations referred to above, the invention proposes a buffer memory management system, each location of said memory being able to store a data block at a location address, and a reference referred to as a data block identifier being associated with each block processed by the system, which system includes:

a.) time management means for data blocks stored in the buffer memory, for commanding reception of a new data block to be stored in the buffer memory; arranging the identifiers of the data blocks stored in the buffer memory in accordance with a given service discipline, by managing, as a function of time parameters associated with the identifiers of said blocks, their respective waiting times in the buffer memory and thereby determining their respective read times for service, each data block having normally to be read a predetermined number of times before freeing its location in the buffer memory and its associated block identifier;

commanding service of a data block to read in the buffer memory; and possibly commanding premature elimination of a predetermined stored data block, freeing of its location in the memory and temporary preservation of its associated block identifier to prevent rearrangement of the time relations between blocks;

b.) free buffer memory location address management means for searching for a free location address in the event of receiving a new data block to be stored in said buffer memory and freeing the address of a location when it is no longer occupied by a data block;

c.) free data block identifier management means for assigning a free block identifier to each new data block stored in the buffer memory and freeing the identifier associated with a data block when it is no longer used for that block;

d.) write control means for writing a new data block in a location of the buffer memory;

e.) read control means for reading the buffer memory in the event of service of a data block;

f.) location/block identifier association management means for storing, for each identifier associated with a data block, the address of the location that it occupies in the buffer memory; and g.) elimination flag management means for storing, for each data block identifier, an elimination flag indicating whether the corresponding block has been eliminated prematurely or not, said elimination flag relating to a data block being marked in the event of premature elimination of that block, the presence or absence of said elimination flag relating to a data block being detected in the event of service of that block in order to read it in the buffer memory, reading of said block being authorized only if the elimination flag corresponding to said block identifier indicates that said block has not already been eliminated, and freeing of the address of the location corresponding to said block after said block has been read a predetermined number of times being authorized only if said block has not already been eliminated characterized in that:

1. the stored data blocks are managed in accordance with a plurality of categories, each block belonging to a given category, said system further includes:

i.) category marking management means for storing a category to which each data block belongs; and ii.) blocks cleared for elimination management means for storing, for each category, a list of the data blocks cleared for elimination belonging to that category; and 2. to enable further the elimination of a data block cleared for elimination from among all the data blocks belonging to a specified category, i.) said category marking management means effect marking of the category of a data block in the event of reception of a new data block and reading to identify the category of a data block in the event of the last service of a data block that has not already been eliminated or in the event of premature elimination of a predetermined data block; and ii.) said blocks cleared for elimination management means add, in the event of the reception of a data block, a new data block to the list of data blocks cleared for elimination that corresponds to the priority category of said new block, and delete a data block from its list of data blocks cleared for elimination, either in the event of the last service of a data block that has not already been eliminated or in the event of premature elimination of a predetermined data block, in which case said block is known and its list corresponds to the category identified for said block by said category marking management means, or in the event of elimination of a data block cleared for elimination in a specified priority category, in which case said blocks cleared for elimination management means select one of the blocks from the list corresponding to said category and then indicate to said elimination flag management means which block has been selected in order for said means to mark the elimination flag storing the elimination of said block.

The system manages the data blocks cleared for elimination either by means of their data block identifier (IBD) or by means of their location (EMT) in the buffer memory.

In the former case of how the buffer memory management system is used, there can be provision for:

a. the data blocks cleared for elimination management means and the category marking management means to address said data blocks by means of their data block identifier (IBD); and b. in the event of elimination of a data block cleared for elimination in a specified priority category, the data blocks cleared for elimination management means to transmit the identifier of the data block selected for elimination:

to the location/block identifier association management means, which then determine the corresponding location address occupied by said data block selected for elimination; and directly as an address of the memory of said elimination flag management means in order for said means to mark the elimination flag storing the elimination of said block.

In the latter case, in which the BD cleared for elimination are managed by means of their location (EMT) in the buffer memory, there can be provision for:

a. the data blocks cleared for elimination management means and the category marking management means to address said data blocks by means of their location address in the buffer memory;

b. the system further to include additional identifier/block location association management means for storing, for each location address (EMT) occupied by a data block in the buffer memory, the identifier (IBD) associated with said block, said identifier being stored at an address corresponding to that of the location occupied by said block in the buffer memory; and c. in the event of elimination of a data block cleared for elimination in a specified priority category, the data blocks cleared for elimination management means to transmit the location address of the data block selected for elimination to the additional identifier/block location association management means which then determine the corresponding identifier of the data block selected for elimination and then supply said data block identifier as an address of the memory of the elimination flag management means in order for said means to mark the elimination flag storing the elimination of said block.

In the case of managing BDs cleared for elimination by means of their identifiers IBD, there can be provision, for the purposes of isolated elimination of a data block cleared for elimination belonging to a specified data block category, for the location address occupied by the data block selected for elimination, determined by the location/block identifier association management means, to be supplied to the free buffer memory location address management means in order for said means to free the location occupied by said block in the buffer memory. In the case of managing BDs cleared for elimination by means of their locations EMT, there can be provision, for the purposes of isolated elimination of a data block cleared for elimination belonging to a specified data block category, for the location address occupied by the data block selected for elimination by the data blocks cleared for elimination management means to be also supplied directly to the free buffer memory location address management means in order for said means to free the location occupied by said block in the buffer memory.

In one embodiment, for executing a process of reception of a new data block with data block substitution, said process consisting of immediately eliminating a data block cleared for elimination belonging to a specified data block category in order to be able to store the new data block received, there can be provision for:

a. the location address in the buffer memory of the data block eliminated to be used in this case as a free location address for storing the new data block received in the buffer memory, said address being supplied:
to the write control means in order for said means to write the new data block at that location address; and
to the location/block identifier association management means in order for said means to store, for the block identifier assigned to said new data block, the address of the location used to store the data block received;

b. the free data block identifier management means to assign a block identifier to the new data block received and supply that identifier:
to the time management means of the data blocks stored in the buffer memory;
to the location/block identifier association management means in order for said means to store, for the block identifier assigned to said new data block, the address of the location used to store the data block received; and
to the elimination flag management means in order for said means to initialize the elimination flag of the new block received to the non-eliminated state;

c. said category marking management means to mark the category of the new data block received; and d. the data blocks cleared for elimination management means to add said new data block to the list of data blocks cleared for elimination that corresponds to the priority category of the new data block received.

In the latter case, and if the data blocks cleared for elimination are managed by means of their identifiers IBD, there can be provision for:

a. the free data block identifier management means also to supply the identifier assigned to the data block received:
to the category management means in order for said means to mark the category of the new data block received; and
to the data blocks cleared for elimination management means in order for said means to add said new data block to the list of data blocks cleared for elimination that corresponds to the priority category of the new data block received; and b. the location address used to store the new block received to be determined by the location/block identifier association management means from the identifier of the block eliminated supplied by the data blocks cleared for elimination management means.

Still in the situation of reception of a new data block with substitution, and when data blocks cleared for elimination are managed by means of their locations EMT in the buffer memory, there can be provision for:

a. the free data block identifier management means also to supply the identifier assigned to the data block received to the additional identifier/block location association management means in order for said means to store, for the buffer memory location in which the new block received is written, its associated identifier; and b. the location address used to store the new data block received to be selected by the data blocks cleared for elimination management means.

In one advantageous embodiment of the invention, the free data block identifier management means and the location/block identifier association management means use a common memory including a memory line for each possible data block identifier, each line of common memory being used exclusively for one or the other of said two types of management means and containing:

a. either the next block identifier (IBD) in the chained list of free block identifiers if the block identifier corresponding to said common memory line is free and managed by the free data block identifier management means;

b. or the address of the location (EMT) of the buffer memory at which is stored a data block having an associated block identifier corresponding to said common memory line, when said identifier is used and managed by the location/block identifier association management means.

In the case of managing data blocks cleared for elimination by means of their locations EMT in the buffer memory, there can advantageously be provision for the free buffer memory location address management means and the additional identifier/block location association management means to use a common memory including a memory line for each possible location address in the buffer memory, each common memory line being used exclusively by one or the other of said two types of management means and containing:

a. either the next location address in the chained list of free memory locations if the location corresponding to said common memory line is free and managed by the free buffer memory location address management means (GEL);
  b. or the block identifier (IBD) associated with a data block stored in the buffer memory at the location address (EMT) corresponding to said common memory line in the event that said location is occupied and managed by the additional identifier/block location association management means.

In the general context of the invention, it is possible to use the chained lists technique to manage the various subsets of data blocks in the system.

Accordingly, there can be provision for the data blocks cleared for elimination management means to manage the various sub-sets of data blocks cleared for elimination using a chained list for each category and for said means to use a common memory including a memory line for each possible data block reference, each line of said common memory being used exclusively by not more than one of said lists for each category and containing the reference of the next block, if any, and the reference of the preceding block, if any, in the chained list of data blocks cleared for elimination corresponding to said category.

In the previous case, and if the data blocks cleared for elimination are managed by means of their data block identifiers, said data blocks references used for addressing said common memory can be data block identifiers.

Similarly, if the data blocks cleared for elimination are managed by means of their buffer memory locations, the data block references used for addressing said common memory can be buffer memory locations.

In the general context of the invention, there can be provision for, in the event of elimination of a data block cleared for elimination in a specified category, the blocks cleared for elimination management means to select the first data block from the list of blocks cleared for elimination corresponding to said specified category.

BRIEF DESCRIPTION OF THE DRAWINGS

The invention will be better understood and other features will become more clearly apparent from the following description and the accompanying drawings, in which:

FIG. 7 is a diagram showing, in the system GBDPC shown in FIG. 1, and in the event of normal BD reception, on the one hand, an operation of storing the category of that BD in the unit GMC and, on the other hand, an operation, in the unit GBDCE, of adding the location EMT of that BD, if it is a BD cleared for elimination (BDCE), into the appropriate chained list of BDCEs;

DETAILED DESCRIPTION OF THE INVENTION

Figure 1:
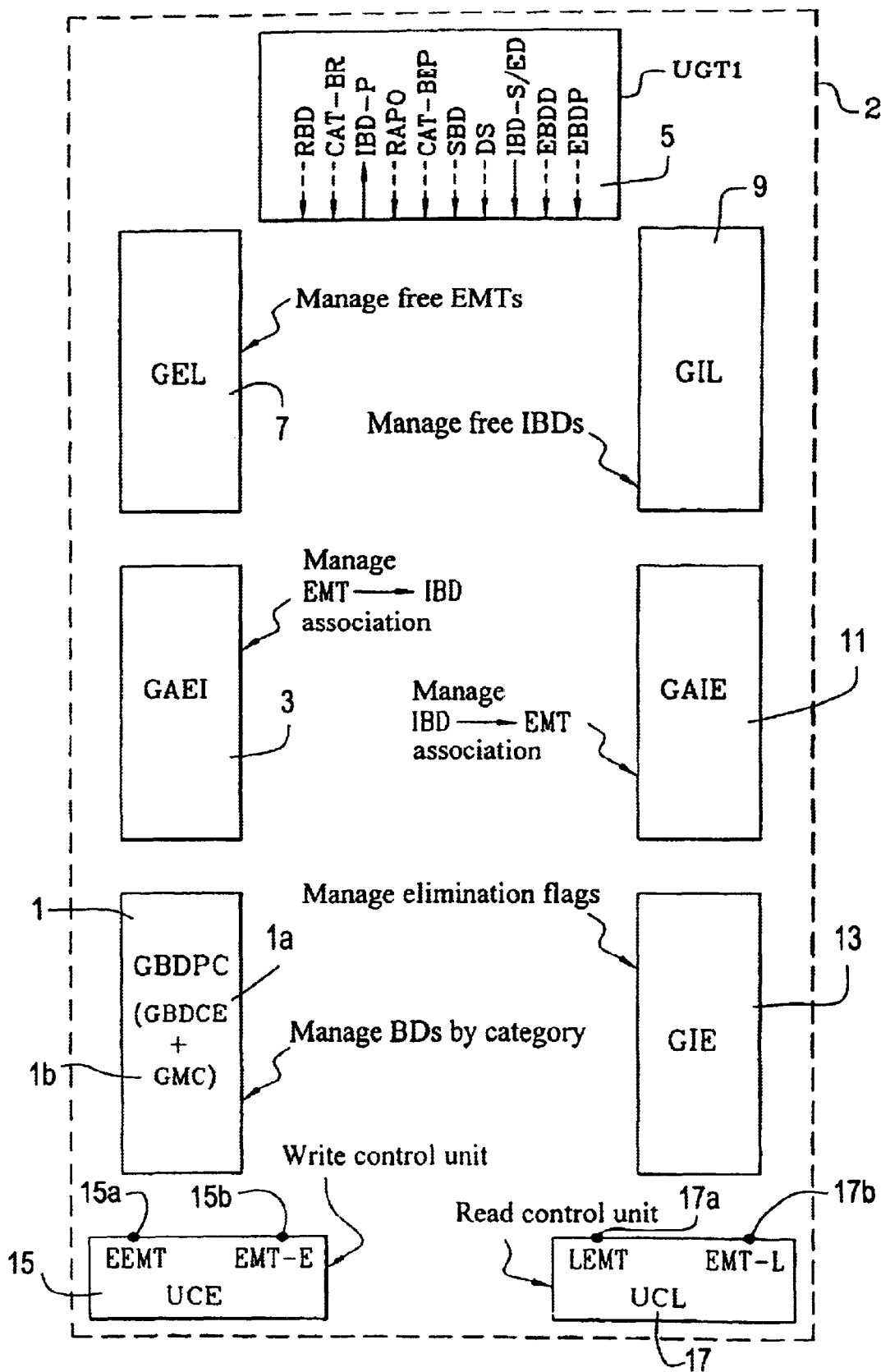
FIG. 1 is an overall block diagram of various units constituting a management system in accordance with the present invention.

The main functional units of the system in accordance with the present invention for managing a buffer memory are briefly described with reference to FIG. 1. All the units represented in FIG. 1 correspond to a complete configuration of the system when a BD cleared for elimination (BDCE) is designated directly in the system GBDPC 1 by its buffer memory location (EMT). As explained below, in a different situation, in which a BDCE is designated indirectly by its data block identifier (IBD), there is no need for the management unit GAEI 3.

The system 2 includes the following functional units:

a. a stored data block time management unit (UGT1) 5 which controls all operations associated with the operation of the system 2 by means of control signals and codes described in detail below;

b. a free location address management unit (GEL) 7 which manages the addresses of free locations in the buffer memory, for example by means of a chained list, in order to supply on demand a free location address EMT in the event of receiving a new BD and freeing the address of a location EMT when it is no longer occupied by a BD;

c. an EMT→IBD association management unit (GAEI) 3, i.e. a unit for managing each location EMT relating to an identifier IBD, which, for each location EMT of the buffer memory occupied by a data block, stores the associated identifier IBD, in accordance with a one-way relation, i.e. the EMT→IBD relation;

d. a free EBD identifier value management unit (GIL) 9, which manages the free identifiers IBD, for example using a chained list, in order to supply on demand a free identifier EBD to be associated with a new BD and to freed the identifier IBD associated with a BD when it is no longer used by the latter;

e. an IBD→EMT association management unit (GAIE) 11, i.e. a unit for managing each identifier IBD relating to a location EMT which, for each identifier IBD associated with a data block, stores the address of the location EMT occupied by that BD in the buffer memory, in accordance with a one-way relation, i.e. the IBD→EMT relation;

f. a system (GBDPC) 1 for managing BD by category, including:
  1. on the one hand, a data block cleared for elimination management unit (GBDCE) 1a, which manages the subsets of BD cleared for elimination (BDCE) for each category of BDCE, for example using a chained list of BDCEs per category; and
  2. on the other hand, a category marking management unit (GMC) 1b, which stores the fact that a BD belongs to a given category;

g. an elimination indication management unit (GIE) 13 which associates with each occupied identifier IBD a binary state indicating if the corresponding BD has been eliminated or not;

h. a write control unit (UCE) 15 for writing the buffer memory; and i. a read control unit (UCL) 17 for reading the buffer memory.

During the course of the various operations that it controls, the stored data block time management unit UGT1 5 interacts with the other units cited above by exchanging the following information:

a. a BD reception outgoing control signal (RBD) which is active at "1" to command a new BD reception operation, the received new BD having to be written in the buffer memory;

b. a received BD category outgoing code (CAT-BR), indicating to which category the BD belongs; this signal is therefore meaningful when the signal RBD is active (RBD=1);

c. a received BD identifier incoming code (IBD-R), constituting the identifier assigned to the new data block received; supplied by the free identifier management unit GIL 9, this identifier is associated with the address of the buffer memory location selected to receive the BD concerned;

d. a BD reception with substitution outgoing control signal (RAPO), indicating, according to its logic state RAPO=1 or RAPO=0, in the event of new BD reception, whether the operation is one of BD reception with substitution (push-out) or of normal reception without substitution, respectively;

e. a BDCE category outgoing code (CAT-BEP), indicating from which category a BD cleared for elimination (BDCE) must be selected, the code CAT-BEP being used either in the event of reception with substitution or in the event of eliminating a BDCE in a given category; the code CAT-BEP is sent to the BD cleared for elimination management unit GBDCE 1a;

f. a data block service outgoing control signal (SBD) which is active at "1" to command a BD service operation and is sent to the units GIL 9, GAIE 11 and GIE 13;

g. a last service outgoing control signal (DS) which is active at "1" and indicates, in the event of a BD service, whether it is the last service of that data block (the same BD can be serviced more than once, for example if it is distributed across a plurality of different outputs of the buffer memory);

h. a BD identifier outgoing code IBD-S/ED for a BD that is either a serviced BD (for which the code is IBD-S) or a given BD destined to be eliminated (for which the code is IBD-ED);

i. a given BD elimination outgoing control signal (EBDD) which is active at "1" to command an operation of eliminating a given BD; and j. a given BDCE elimination outgoing control signal (EBDP) which is active at "1" to command an operation of eliminating a BD cleared for elimination in a given category.

Exchanges of the control signals and codes cited above between the various units of the management system are shown by interconnecting lines in the subsequent figures: by convention, continuous lines are used for codes and dashed lines for control signals. Note that the control signals are assumed to be active at "1" in the following examples.

In the example described, it is assumed that the free location management unit (GEL) 7 and the free identifier management unit (GIL) 9 each manage their free entities (respectively EMTs and IBDs) using a conventional chained list in a chained list links memory (respectively addressed by EMT and IBD), associated with a pair of pointers.

By design, the memory of the GEL 7 and GIL 9 units therefore includes as many lines as there are managed entities (EMTs or IBDs, respectively), and each memory line of an entity that is free contains the adjacent link with (i.e. the address of) the next free entity (EMT or IBD, respectively) in the chained list of free entities, thereby forming an ordered concatenation of those free entities.

This kind of chained list is one of various conventional means of managing a dynamic subset in memory of L entities (in this instance the entities are the free EMTs or IBDs) from among P possible entities (i.e. all the EMTs or IBDs). This kind of chained list is managed by means of two pointers, namely a head-of-list pointer and an end-of-list pointer. The head-of-list pointer indicates the address of the first entity in the list and the end-of-list pointer indicates the address of the last entity in the list.

In this kind of chained list of free entities, to take a free entity, the address of the first free entity that is at the head of the list, as indicated by the corresponding pointer, is selected. Then, to update that list, the address of the adjacent link to the next free entity is read in the memory, at the address initially provided by the head-of-list pointer, and the head-of-list pointer is positioned on the line of the memory that corresponds to the address read in the memory, so that the head-of-list pointer then contains that new first free entity at the head-of-list address.

Conversely, to introduce a new free entity into this kind of chained list, the new entity is added to the end of the list by writing the address of that new entity as the new last adjacent link to that new entity at the memory address indicated by the end-of-list pointer. Furthermore, to update the end-of-list pointer, it is positioned on the memory line that corresponds to the address of the new free entity added, so that the end-of-list pointer then contains the address of the new last free entity at the end of the list.

By design, a solution based on this kind of conventional chained list, used for the units GEL 7 and GIL 9, for example, is found to ensure ordered management of those entities. However, in the present application of a buffer memory management system, it must be noted that the management of the free EMT and free IBD entities, in the units GEL 7 and GIL 9, respectively, does not generally necessitate ordered management of those entities. In fact, in accordance with the invention, other means can also be used to manage the free EMT and free IBD entities, whatever the order in which such other means manage them.

The association management units GAEI 3 and GAIE 11 store the one-to-one relation between the location EMT occupied by a BD in the buffer memory and the identifier IBD associated with that BD. The unit GAEI 3 manages the EMT→IBD relation and the unit GAIE 11 manages the IBD EMT relation. In the example described, it is assumed that each of the units GAEI 3 and GAIE 11 uses a memory for the relation between two entities that has as many lines as there are possible values of the first entity (respectively the EMT and IBD addresses), and each line of which relating to a first occupied entity contains the corresponding value of the associated second entity (IBD and EMT, respectively).

The function of the write control unit UCE 15 is to command writing of a BD in the buffer memory at a given address EMT. It has two inputs; a first input receives a write at address EMT command signal (EEMT) 15a, activating writing in the buffer memory, and a second input receives a write address EMT code (EMT-E) 15b, providing the address of the location EMT at which the BD must be written. The unit UCE 15 uses the EEMT 15a and EMT-E 15b information to write a BD in the buffer memory in the conventional way.

The function of the read control unit UCL 17 is to command the reading of a BD in the buffer memory at a given address EMT. It also has two inputs; a first input receives a read at address EMT control signal (LEMT) 17a, activating reading in the buffer memory, and a second input receives a read address EMT code (EMT-L) 17b, providing the address of the location EMT at which that BD must be read. The unit UCL 17 uses the LEMT 17a and EMT-L 17b information to read a BD in the buffer memory in the conventional way.

The function of the elimination flag management unit GIE 7 is to store an associated binary state, called the elimination flag, for each occupied BD identifier in the system, which indicates whether the corresponding BD has been eliminated or not. To this end, the unit GIE 7 includes a memory addressed by IBD, each line of which stores the non-eliminated BD state (BDNE), for example such that the eliminated or not-eliminated state of a BD respectively corresponds to the value BDNE=0 or BDNE=1. In the unit GIE 7, the flag BDNE associated with a BD is initially marked at "1" in the event of BD reception and is marked at "0" in the event of premature BD elimination.

In the system (GBDPC) 1 specific to the invention for managing BD by category, the management units GBDCE 1a and GMC 1b manage each BD as a function of the category to which it belongs (typically the priority level). Complementing this, the unit GBDCE 1a manages the C subsets of BDs cleared for elimination (BDCEs) relating to the n categories of BDs (typically the C subsets of BDCEs corresponding to the n−1 categories of lower priority), and the unit GMC 1b stores whichever of the n possible categories to which each BD belongs.

In the example described, the C subsets of BDCEs per category are managed by the unit GBDCE 1a with the aid of C chained lists, there being one list for each of the C subsets of BDCEs corresponding to a given category. Each chained list of BDCEs simply implies the use of a chained list link memory and a pair of associated pointers, namely a head-of-list pointer and an end-of-list pointer.

However, to avoid the need for a multiplicity of memories (one for each of the C chained lists of BDCEs), the unit GBDCE 1a to be described exploits the fact a given BD corresponds to only one category and therefore at any given time can be present only in one chained list of BDCEs, so that the various chained lists of BDCEs can be advantageously managed in a single common memory with as many lines as there are BDs to be generated. Accordingly, because the C chained lists per category are mutually exclusive, they can be managed in a single link memory for the C chained lists, associated with C pairs of pointers, each pair comprising a head-of-list pointer and an end-of-list pointer for each of the C chained lists of BDCEs in each category.

Then, in the unit GBDCE 1a: in the event of new BD reception, a new BDCE is added to the end of the list corresponding to the category to which the received new BD belongs; on eliminating a BD belonging to a given category, the first BD is taken from the head of the list corresponding to the designated category; in the event of releasing a BD after its last service or eliminating a given BD, the BD is removed from the list of BDCEs corresponding to the category to which that BD belongs. These operations are described in more detail below.

Complementing this, to store the category to which each BD belongs, the unit GMC 1b includes a relation memory in which, for each occupied BD, each BD line contains the code of its category. Accordingly, in the unit GMC 1b: in the event of new BD reception, the category code of the new BD is written in memory, and in the event of the last service of a BD, or the elimination of a given BD, the category to which that BD belongs is identified by reading the memory, in order to be able afterwards to remove that BD from the list of BDCEs corresponding to the category to which that BD belongs in the unit GBDCE 1a.

In the units GBDCE 1a and GMC 1b, the lines of their respective memories can be addressed by data blocks in two ways, namely by using for the address of each BD either its location EMT or its identifier IBD.

Designating a BDCE directly by its location address EMT is more natural and a priori less costly in memory (because in this case the number of addresses EMT managed can be smaller than the number of identifiers IBD). However, this natural approach also entails managing the EMT→IBD relation function (in the unit GAEI 3), because eliminating a BDCE in a given category necessitates first identifying the identifier IBD of the BD selected for elimination. In this case, based on the location EMT of the BDCE selected for elimination in the unit GBDCE 1a, it is necessary to identify its associated identifier IBD, which is required for marking the elimination flag BDNE of that BD in the eliminated BD state (BDNE=0) in the unit GIE 13.

In contrast, designating the BDCE by its associated identifier IBD avoids the need also to manage the EMT→IBD relation function, in which case the unit GAEI 11 is not necessary.

It is assumed, by way of example, in the following description that the first alternative is adopted, i.e. that, in the units GBDCE 1a and GMC 1b, the locations EMT are used to address the lines of their respective memories for each data block.

The various operations possible using the management unit 2, including the stored data block time management unit UGT1 5 and the various associated management units, will now be described, namely:

normal BD reception, without substitution,
BD reception with substitution (push-out),
BD service, with or without release, and
BD elimination, either of a given BD or a BD cleared for elimination in a given category.

1. Normal BD Reception (Without Substitution)

This relates to normal BD reception, the data block belonging to a given category, and consists in storing a received new BD in a free location of the buffer memory. This first type of BD reception is referred to as normal reception when it is effected without any BD substitution, and therefore when there remains at least one free location for writing the received BD in the buffer memory, possibly taking the category of that BD into account.

Figure 2:
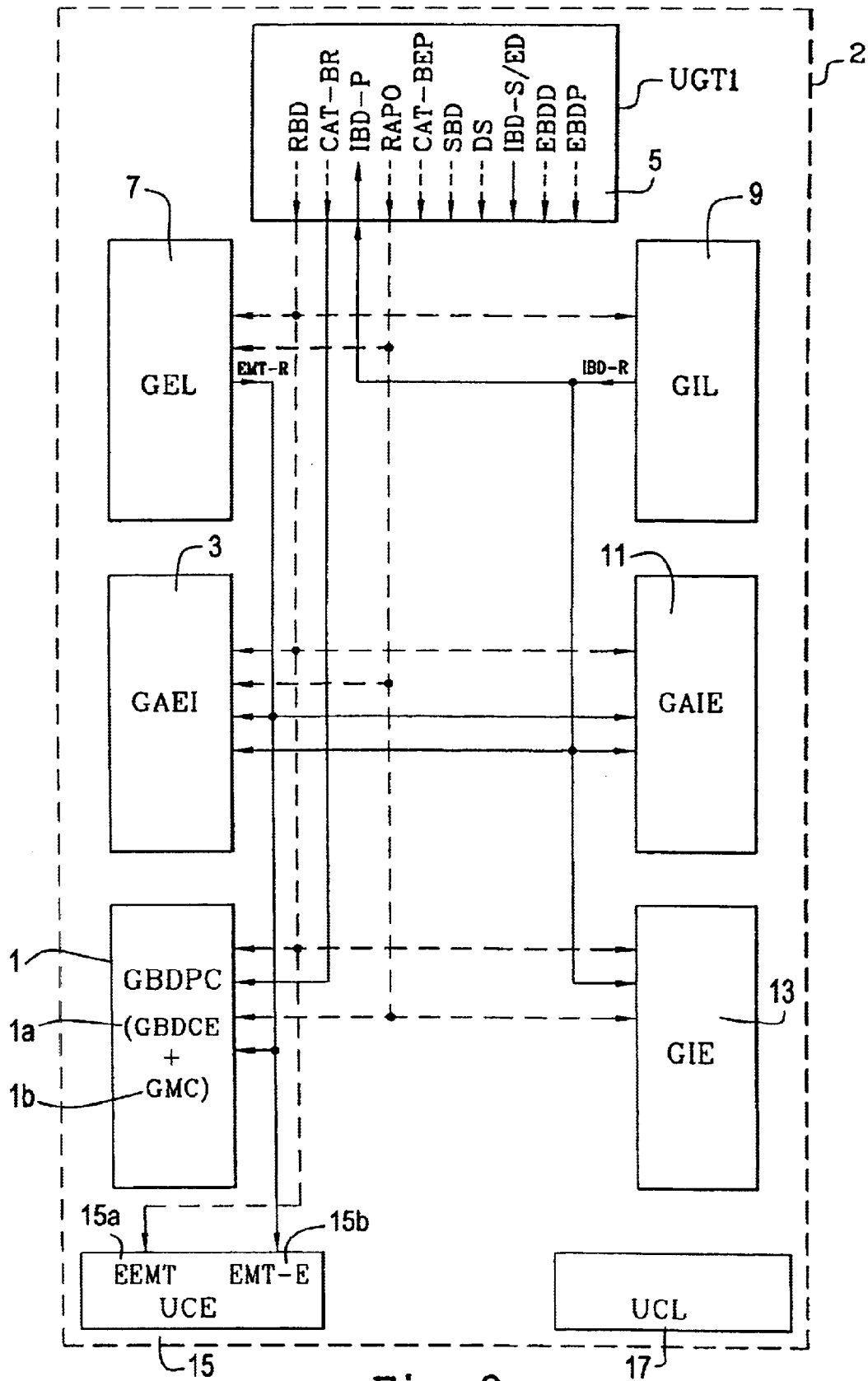
FIG. 2 shows exchanges of information between the units of the system in the event of data block (BD) reception with no substitution (push-out)

FIG. 2 shows the exchange of information between the various units. Normal BD reception is characterized by the simultaneous presence of an active control signal RBD=1 (indicating a data block reception operation) and an inactive control signal RAPO=0 (indicating that this BD reception must be effected without substitution).

The signals RBD=1 and RAP=0 are transmitted by the unit UGT1 5 to the units GEL 7, GAEI 3, GIE 13 and to the system GBDPC 1 including the units GBDCE 1a and GMC 1b; only the signal RBD=1 is transmitted to the units GIL 9 and GAIE 11 and to the input EEMT 15a of the write control unit UCE 15. This is because the units GIL 9 and GAIE 11 are not directly concerned with whether reception needs to be effected with or without substitution. Also, the unit UGT1 5 transmits the category code CAT-BR to the unit GBDCE 1a to supply it with the category (j) of the BD currently being received.

In response to the signals RBD=1 and RAPO=0, the unit GEL 7 supplies the first free location EMT, designated EMT-R, in its chained list of free locations EMT, which is assigned to the new data block. The location address code EMT-R is transmitted directly to the input EMT-E of the unit UCE 15, to the units GAEI 3 and GAIE 11, and to the system GBDPC 1 comprising the units GBDCE 1a and GMC 1b.

Simultaneously, and in response to the signal RBD=1, the unit GIL 9 supplies the first free identifier IBD, designated IBD-R, in its chained list of free identifiers IBD, which is assigned to the new data block. The identifier code IBD-R is transmitted to the management unit UGT1 5 and to the units GAEI 3, GAIE 11 and GIE 13.

On receiving the codes EMT-R and IBD-R, the unit GAEI 3 stores the EMT→IBD association in its relation memory, as previously explained; similarly, the unit GAIE 11 stores the IBD EMT association in its relation memory.

In the system GBDPC 1 comprising the units GMC 1b and GBDCE 1c, the category CAT-BR=j of the received new BD is stored in the memory of the unit GMC 1b and, where applicable, the location address EMT-R of the received new BD is added to the end of the chained list of BDCEs corresponding to its category CAT-BR in the unit GBDCE 1a. The category code CAT-BR=j to which the received new BD belongs is stored in the memory of the category marking management unit (GMC) 1b. Also, if the received BD is cleared for elimination (BDCE), i.e. likely to be eliminated because of its category, which is generally the case if that category does not correspond to the highest level of the hierarchy, the new BDCE is written as such in the data block cleared for elimination management unit GBDCE 1a of the system GBDPC 1.

Finally, the fact that the received new BD, designated by its IBD, is initially in the non-eliminated BD state (BDNE=1) is marked in the memory of the unit GIE 13.

Figure 3:
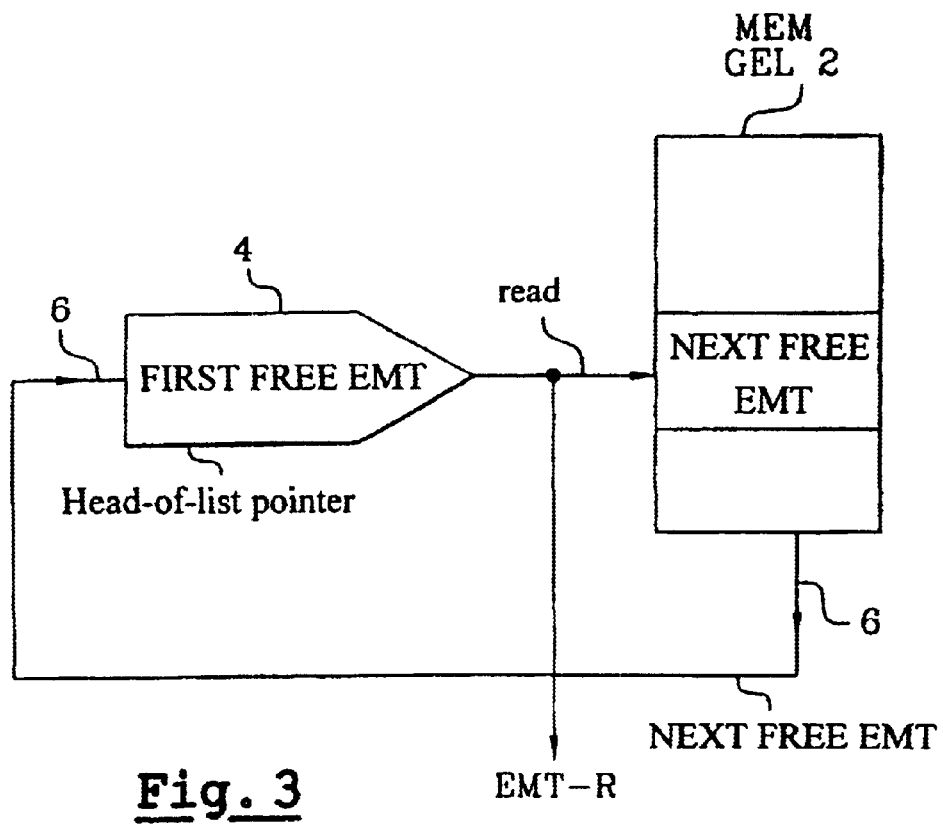
FIG. 3 is a diagram showing an operation of selecting a free buffer memory location (EMT) in the unit GEL shown in FIG. 1.

FIG. 3 shows diagrammatically the operation effected in the unit GEL 7 in the case of management using chained lists, which consists of supplying the code of the first free location address EMT (designated EMT-R) in the list. As previously explained, when this kind of chained list is used, the head-of-list pointer 4 associated with the memory, which contains the address of the first free location EMT, supplies the location address code EMT-R directly to the output. The pointer must then be updated to indicate the address of the next free location EMT in the list. To identify the address of the next free location EMT, the content of the line corresponding to the first free location EMT indicated by the pointer 4 is read in the memory 2. The next free location EMT address code outgoing from the memory is then written in this pointer(loop 6).

Figure 4:
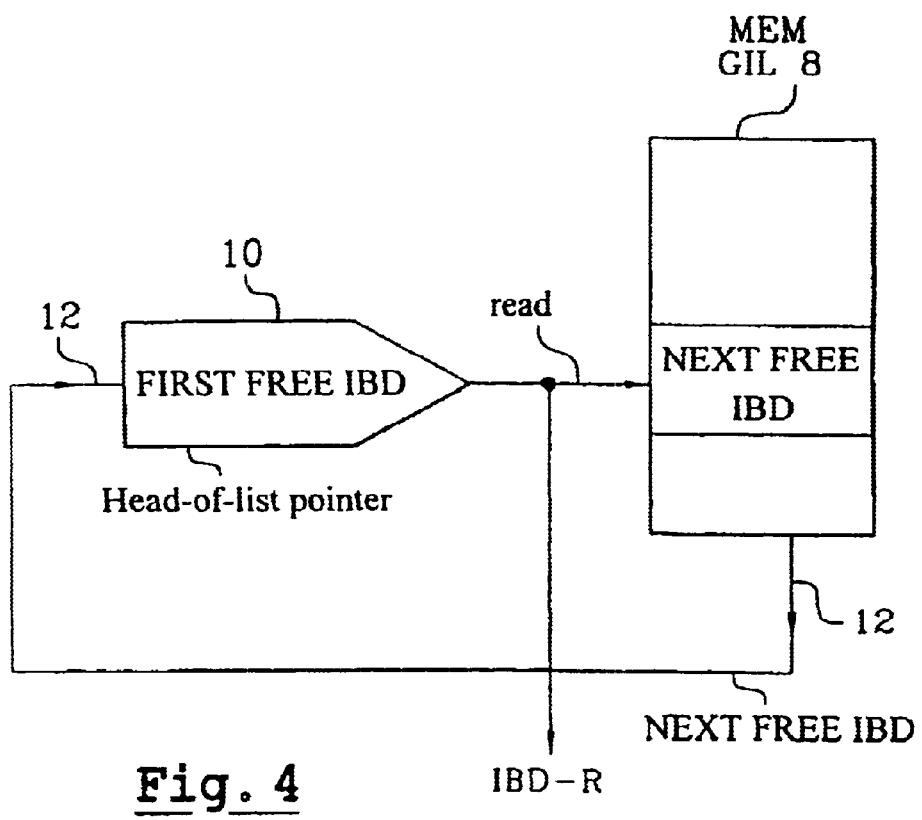
FIG. 4 is a diagram showing an operation of selecting a free BD identifier (IBD) in the unit GIL shown in FIG. 1.

FIG. 4 shows diagrammatically the operation effected in the unit GIL 9 in the case of management using chained lists, which consists of supplying the code of the first free identifier IBD (designated IBD-R). This operation is effected exactly as previously in the unit GEL 7. The head-of-list pointer 10 associated with the memory 8 supplies the identifier code IBD-R directly to the output. The pointer is then updated by reading in the memory 8 the content of the line corresponding to the first free identifier IBD indicated by the pointer 10 and writing in that pointer the code of the next free identifier IBD outgoing from the memory via the loop 12, in the manner of the loop 6 previously cited.

Figure 5:
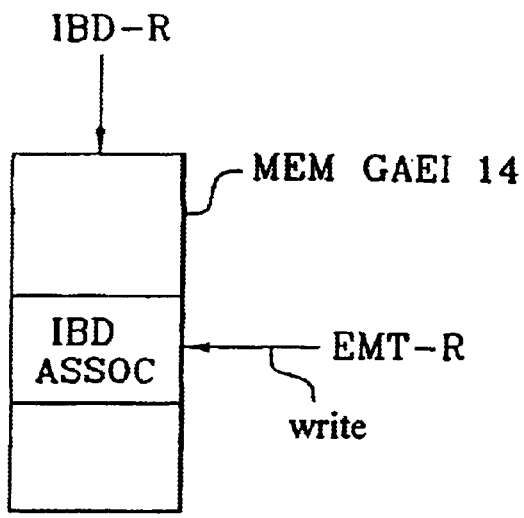
FIG. 5 is a diagram showing an operation of storing the identifier IBD associated with an occupied EMT in the unit GAEI shown in FIG. 1.

FIG. 5 shows diagrammatically the operation effected in the relation memory 14 of the unit GAEI 3 to store the EMT→IBD relation, i.e. to write into memory the identifier IBD-R associated with the received new BD designated by the address EMT-R of its location. As previously explained, this kind of memory for the relation between two entities includes as many lines as there are possible values of the first entity (here the address EMT) and each line of which relating to a first entity (EMT) occupied contains the corresponding value of the associated second entity (here the identifier IBD). In the event of BD reception, the operation of storing the EMT→IBD relation in the unit GAEI 3 is effected by writing the incoming identifier code IBD-R supplied by the unit GIL 9 into the memory line of the relation memory 14 corresponding to the incoming location address code EMT-R supplied by the unit GEL 7.

Figure 6:
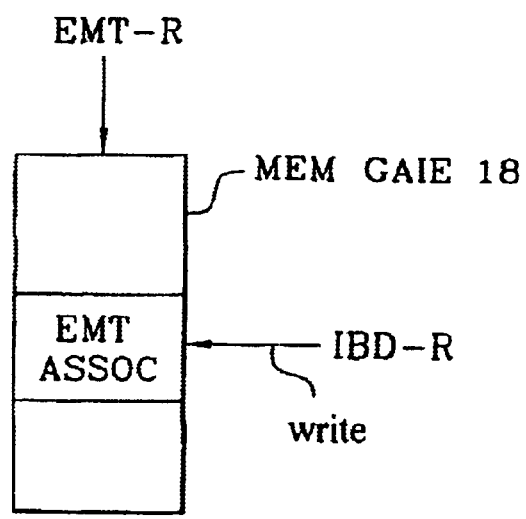
FIG. 6 is a diagram showing an operation of storing the location address EMT corresponding to an occupied identifier IBD in the unit GAIE shown in FIG. 1.

FIG. 6 shows diagrammatically the operation effected in the relation memory 18 of the unit GAIE 11 to store the IBD EMT relation, i.e. to write into memory the location address EMT-R assigned to the received new BD, designated by its identifier IBD-R. This operation is entirely similar to that previously effected in the unit GAEI 3. In the event of BD reception, the operation of storing the IBD→EMT relation in the unit GAIE 11 is effected by writing the incoming location address code EMT-R supplied by the unit GEL 7 into the memory line of the relation memory 18 corresponding to the incoming identifier code IBD-R supplied by the unit GIL 9.

FIG. 7 shows diagrammatically the BD management by category operations effected conjointly in the units GBDCE 1a and GMC 1b of the system GBDPC 1. As previously explained, the unit GBDCE 1a manages the various subsets of BDs cleared for elimination (BDCE) relating to the n categories of BDCE, and the unit GMC 1b stores the category to which each BD belongs.

In the unit GMC 1b, in the event of new BD reception without substitution, the EMT→category relation is stored by writing the category CAT-BR of the received new BD into the relation MCAT 28 at the location address EMT-R supplied by the unit GEL 7.

In the unit GBDCE 1a, the C subsets of BDCEs by category are managed by the unit GBDCE 1a using C chained lists, one for each of the C subsets of BDCEs corresponding to a given category. In each of the C chained lists of BDCEs by category, the unit GBDCE 1a manages the BD cleared for elimination in an ordered way so that, if necessary, the first BDCE to be eliminated from the buffer memory, for example in the event of BD reception with substitution, can be selected in a given category. The selected BDCE is then the first one at the head of the chained list, designated by the head-of-BDCE-list pointer that corresponds to the given category.

Note that, depending on the algorithm used to control loss of data blocks in the applications of the buffer memory management system of concern here, the order in which a BD cleared for elimination (BDCE) is selected may either be important or immaterial. If the order is important, the unit GBDCE 1a of the invention must be implemented by management means that respect the order of the BDCEs, for example using chained lists, as is assumed in the example described. If order is immaterial, other means can be used for managing the BDCEs, whatever the order in which they manage them.

As previously explained, in order to avoid a multiplicity of corresponding chained list link memories (one for each of the C chained lists of BDCEs), the example of the unit GBDCE 1a described here exploits the fact that the various chained lists of BDCEs can advantageously be managed in a single common memory 22 including as many lines as there are BDs to be managed, a given BD belonging to only one category and therefore being able to be present only in one chained list of BDCEs; it is assumed here that each memory line is addressed by means of the code for the location EMT assigned to the BD. Accordingly, the C chained lists of BDCEs by category are mutually exclusive and can therefore be managed in a single chained list link memory 22. Of course, the same result can be obtained by replacing the common memory 22 with C memories each dedicated to managing one of the n chained lists of BDCEs by category.

The common memory 22 is associated with C pairs of pointers (24a/26a, . . . , 24C/26C), i.e. with a head-of-list pointer and an end-of-list pointer for each of the C chained lists of BDCEs by category.

The operation performed in the unit GBDCE 1a in the event of new BD reception without substitution consists of adding a new BDCE to the end of the list corresponding to the category CAT-BR=j to which the received new BD belongs.

However, as described below, if it is necessary to remove a given BDCE from its chained list of BDCEs (for example if the BD would be released after being serviced), the corresponding BDCE might be somewhere other than at the head or at the end of the list, that is to say, it might be somewhere within the list. In order to be able to remove a BDCE from somewhere within the list, the chained lists of BDCEs are organized using two chains, each entity (here a BDCE addressed by means of its EMT) in the list being linked by two adjacent links, a downstream adjacent link (with the next EMT entity) and an upstream adjacent link (with the preceding EMT entity). This conventional technique of chained lists with two chains enables an ordered list of the EMT entities to be maintained even if one of them is removed from somewhere within the list. To this end, starting from the address of the EMT entity to be removed, the addresses of the adjacent (next and preceding) EMT identities in the list are identified; they are indicated by the pair of downstream and upstream adjacent links of the EMT entity to be removed; new reciprocal links are then established between the two identified EMT entities: a downstream adjacent link to the next EMT entity from the preceding EMT entity and an upstream adjacent link to the preceding EMT entity from the next EMT entity. In practice, as shown in FIG. 7, this implies that the common memory 22 can be implemented in the form of two memories addressed separately, one for downstream chaining and the other for upstream chaining.

Accordingly, in FIG. 7, in the event of new BD reception without substitution, the location address EMT-R of the received BD is added, as a new BDCE, to the end of the required chained list of BDCEs (relating to the category CAT-BR=j), if the category of that BD indicates that it is susceptible to be eliminated, i.e. that it belongs to one of the C categories of BDCE. If this is the case, the pair of pointers (24a/26a) associated with the chained list corresponding to the category CAT-BR=j (supplied by the unit UGT1 5) is selected. The downstream adjacent link can then be established by using the end-of-list pointer PFL-BDCE 24a of this pair to address the downstream chaining part of the memory 22 and to write therein the location code EMT-R of the BDCE added (which is supplied by the unit GEL 7); to establish the upstream adjacent link, the upstream chaining part of the memory 22 is addressed using the location code EMT-R and the location code EMT indicated by the end-of-list point PFL-BDCE 24a is written therein. Finally, the pointer is updated by writing in it the location code EMT-R of the BDCE added as the new last BDCE at the end of the list.

Figure 8:
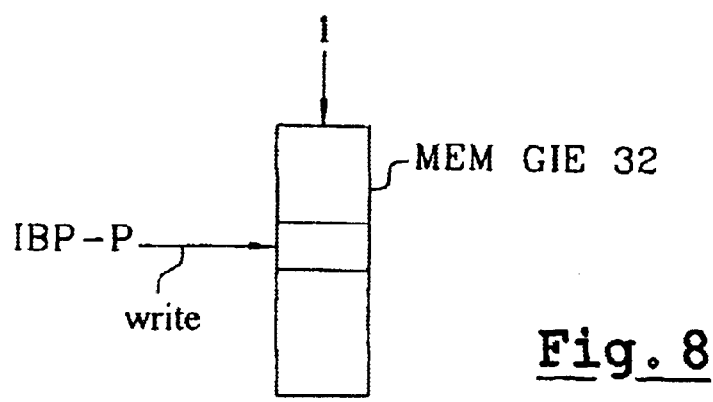
FIG. 8 is a diagram showing, in the event of new BD reception, an operation, in the unit GIE shown in FIG. 1, of marking an elimination flag in the non-eliminated BD initial state.

FIG. 8 shows the MIE memory 32 of the elimination flag management unit GIE 13. The memory has a line for each possible identifier IBD value in the system, each line storing a non-eliminated BD binary status flag (BDNE) which indicates at all times whether a given BD, designated by its identifier IBD, has been eliminated or not. In the example described, the binary flag BDNE is such that the eliminated or non-eliminated state of a BD respectively corresponds to BDNE=0 or BDNE=1. The flag BDNE associated with a BD is therefore initially marked at "1" when the BD is received.

Accordingly, in the unit GIE 13, in the event of new BD reception, the incoming identifier code IBD-R, which is supplied by the unit GIL 9, addresses the MIE memory 32 to write a flag BDNE at "1" into the line corresponding to the identifier IBD-R. The logic state BDNE=1 is initialized by the unit GIE 13 in response to the control signals RBD=1 and RAPO=0.

2. Service of a Data Block (SBD=1) Without Release (DS=0).

This kind of BD service without release operation can exist in the general case of a service discipline where the same BD can be read more than once in the buffer memory, at different service times. Reading a BD does not then imply its release, unless this constitutes the last service scheduled for the BD, as indicated by the active signal DS=1 supplied by the unit UGT1 5. In the particular case of a service discipline whereby the same BD can be read only once in the buffer memory, the unit UGT1 5 would therefore systematically supply an active control signal DS=1 at each time of service.

This chapter considers first the situation in which the BD service is not the last service (DS=0), and is therefore effected without release, because at least one further service of the BD is scheduled.

Figure 9:
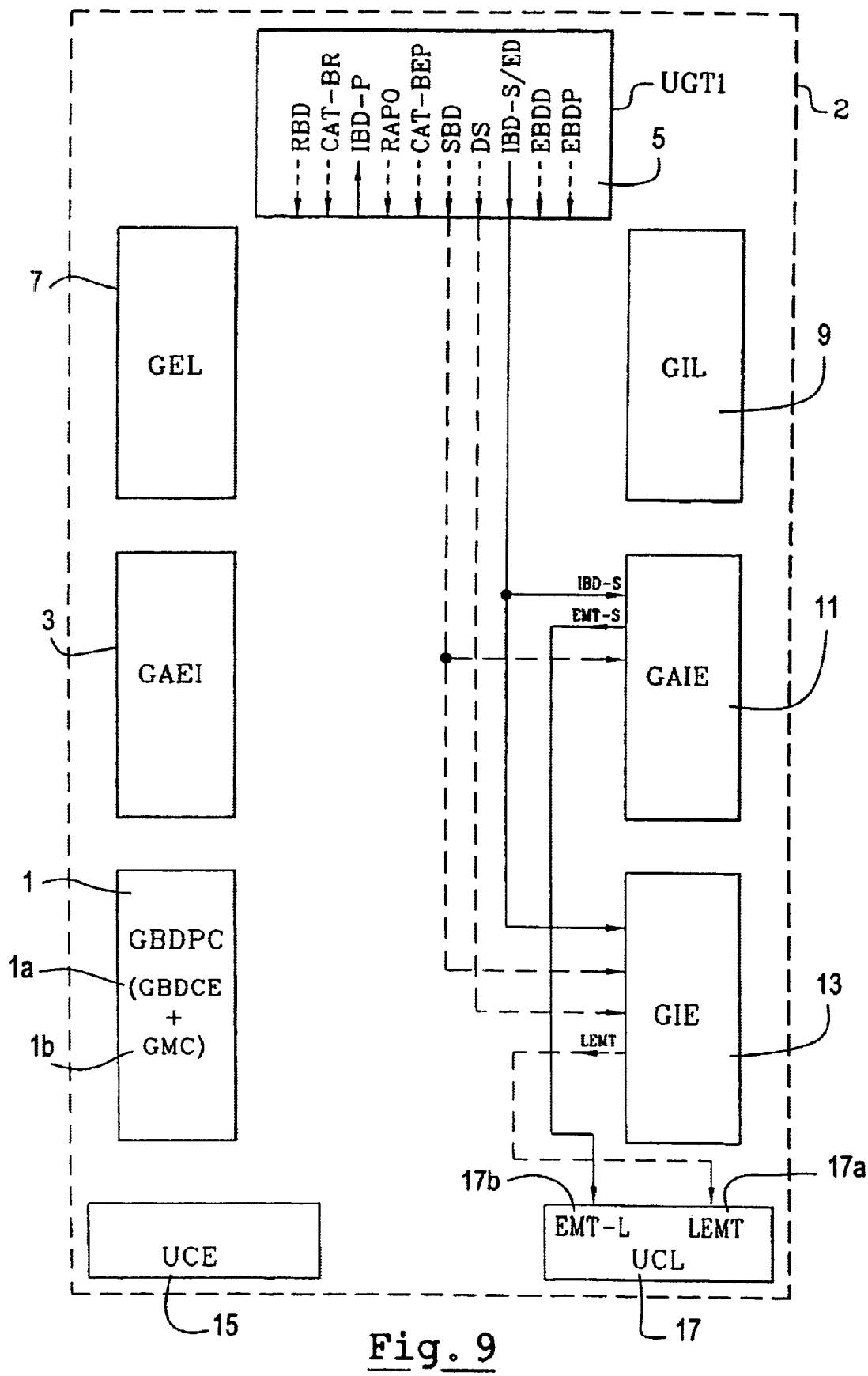
FIG. 9 shows exchanges of information between the units of the system in the event of a BD service that is not its last service.

FIG. 9 shows the exchanges of information between the various units. BD service without release is characterized by the simultaneous presence of an active control signal SBD =1 (indicating that this is a BD service) and an inactive control signal DS=0 (indicating that it is not the last service).

The unit UGT1 5 transmits both signals SBD and DS to the unit GIE 13 and only the signal SBD to the unit GAIE 11. The unit UGT1 5 also transmits the identifier code IBD-S of the serviced BD to the units GAIE 11 and GIE 13.

Figure 10:
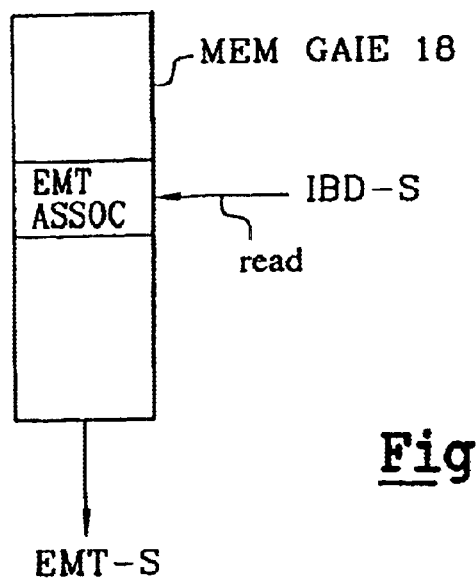
FIG. 10 is a diagram showing an operation of identifying, in the unit GAIE shown in FIG. 1, the location EMT corresponding to a given identifier IBD.

As shown in FIG. 10, the incoming identifier code IBD-S (arrow 20) supplied by the unit UGT1 5 reads the relation memory 18 of the unit GAIE 11 to identify the associated outgoing location code EMT-S, in accordance with the IBD→EMT relation previously stored at the time of reception of the BD (see Chapter 1). The associated location code EMT-S, which constitutes the read address of the serviced BD in the buffer memory, is transmitted to the input EMT-L of the read control unit UCL 17.

Figure 11:
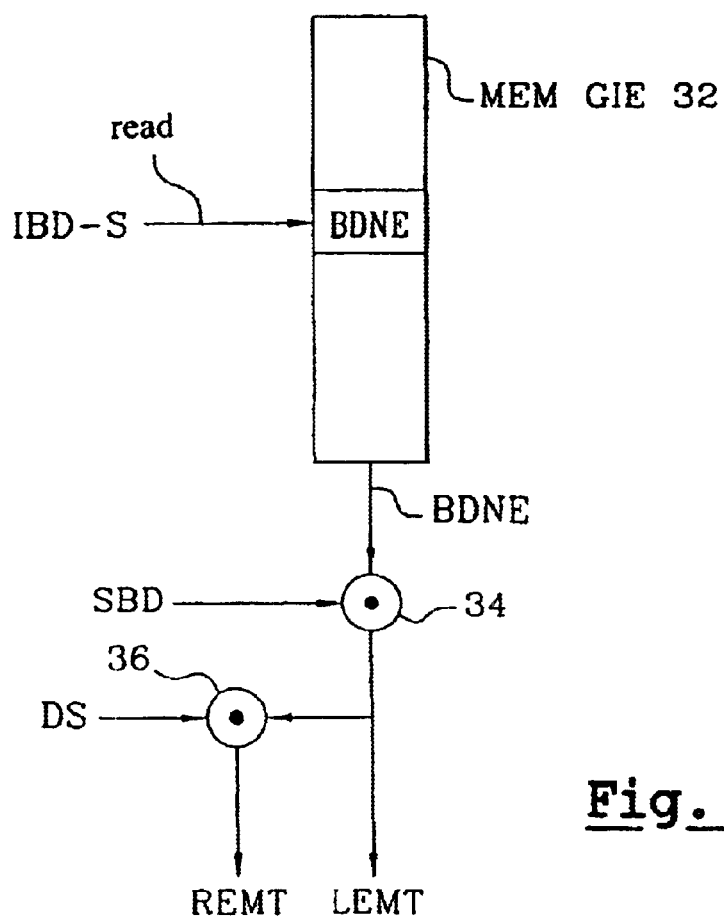
FIG. 11 is a diagram showing an operation, in the unit GIE,of identifying the elimination flag of a BD designated by its identifier IBD and of logical processing of the identified flag.

In the unit GIE 13, the incoming identifier code IBD-S supplied by the unit UGT1 5 is used as an address for reading the flag memory 32 to identify the state of the flag BDNE associated with the BD. A sequence of logical operations is applied to the flag BDNE read in the memory, as shown in FIG. 11.

The flag BDNE read in the memory indicates whether the state of the BD is non-eliminated (BDNE=1) or eliminated (BDNE=0). It is possible, in the event of a BD service, for the BD, which is designated by its identifier IBD, to be no longer present in the location EMT that it previously occupied in the buffer memory, i.e. for it to have been eliminated prematurely, even though it is still considered to be managed on the basis of its identifier IBD by the time management functions of the unit UGT1 5. In other words, there is an operating mode in which a BD can be eliminated prematurely from the buffer memory, thus enabling a new BD to be written into the freed location EMT that it previously occupied, without it being necessary to release its associated identifier IBD immediately, so avoiding modifying the BD time management (for example queue management) functions that are managed on the basis of their identifier IBD if the BD eliminated in this way had to be withdrawn. This provision, which constitutes the subject matter of the applicant's patent FR 96 104 391 simplifies the implementation of the BD time management arrangements associated with a buffer memory.

The flag BDNE from the memory 32 is received at a first input of a first AND gate 34 whose second input receives the signal SBD active at "1".

In this case, the output of the AND gate 34 therefore delivers an outgoing buffer memory read enable command LEMT 17a, the state of which depends on that of the flag BDNE:

If the BD has not been eliminated already (BDNE=1), the signal LEMT 17a is active at "1" because the condition (BDNE=1).(SBD=1) is true.

The outgoing control signal LEMT 17a active at "1" is transmitted to the input LEMT 17a of the read control unit UCL 17 to enable reading of the serviced BD in the buffer memory.

If the BD has already been eliminated (BDNE=0) the signal LEMT 17a is not active (it is at "0"), the outgoing control signal LEMT 17a is not active, and reading of the serviced BD is therefore not enabled in the unit UCL 17.

The output from the AND gate 34 is also supplied to a first input of a second AND gate 36 whose second input is connected to receive the signal DS. The AND gate 36 supplies an outgoing control signal REMT for releasing the buffer memory when the condition (LEMT=1).(DS=1) is satisfied, i.e. at the time of the last service of a data block (DS=1), and if the serviced BD has not already been eliminated (BDNE=1). In the case considered here, the signal DS is not active (DS=0) and the outgoing signal REMT is therefore not activated (REMT=0).

As described below (in relation to FIG. 12) the outgoing signal REMT is transmitted to the free location management unit GEL 7 and to the units of the management system GBDPC 1. The release control signal REMT is used by these units in the event of a last service, in which case REMT=1, as the control signal for triggering freeing of the location EMT of the unit GEL 7 and for withdrawing the BD from the list of BDCEs in the unit GBDCE 1a. In this instance, the units GEL 7, GMC 1b and GBDCE 1a remain inactive because they receive a signal REMT at "0".

Note that BD service without release of its IBD and its EMT (or only its IBD) does not imply any change in the chained lists of the units GIL 9, GEL 7, GBDCE 1a. This is not the case if reading a BD of the buffer memory concerns a last service, as will become apparent in Chapters 3 and 4 below.

3. Last Service of a Data Block (DS=1) with Release of EMT and IBD.

The last BD service is the operation such that, after the service, the BD will have been serviced a predetermined number of times in the buffer memory, in which case it can be released.

This chapter considers the normal situation in which the last BD service implies releasing both its location EMT and its identifier IBD, i.e. when the serviced BD has not been prematurely eliminated (BDNE=1) and is therefore still present at its location EMT in the buffer memory; the situation in which the serviced BD has been prematurely eliminated (BDNE=0) is discussed in Chapter 4 below.

Note that unlike a BD service without release (see Chapter 2), a last BD service with release of its IBD and EMT also necessitates freeing of the location EMT and the identifier IBD of the BD, which become free and must be respectively added to the chained lists of free EMTs (in the unit GEL 7) and free IBDs (in the unit GIL 9) and also, where applicable, removal of the BD from its list of BDCEs in the unit GBDCE 1a.

Figure 12:
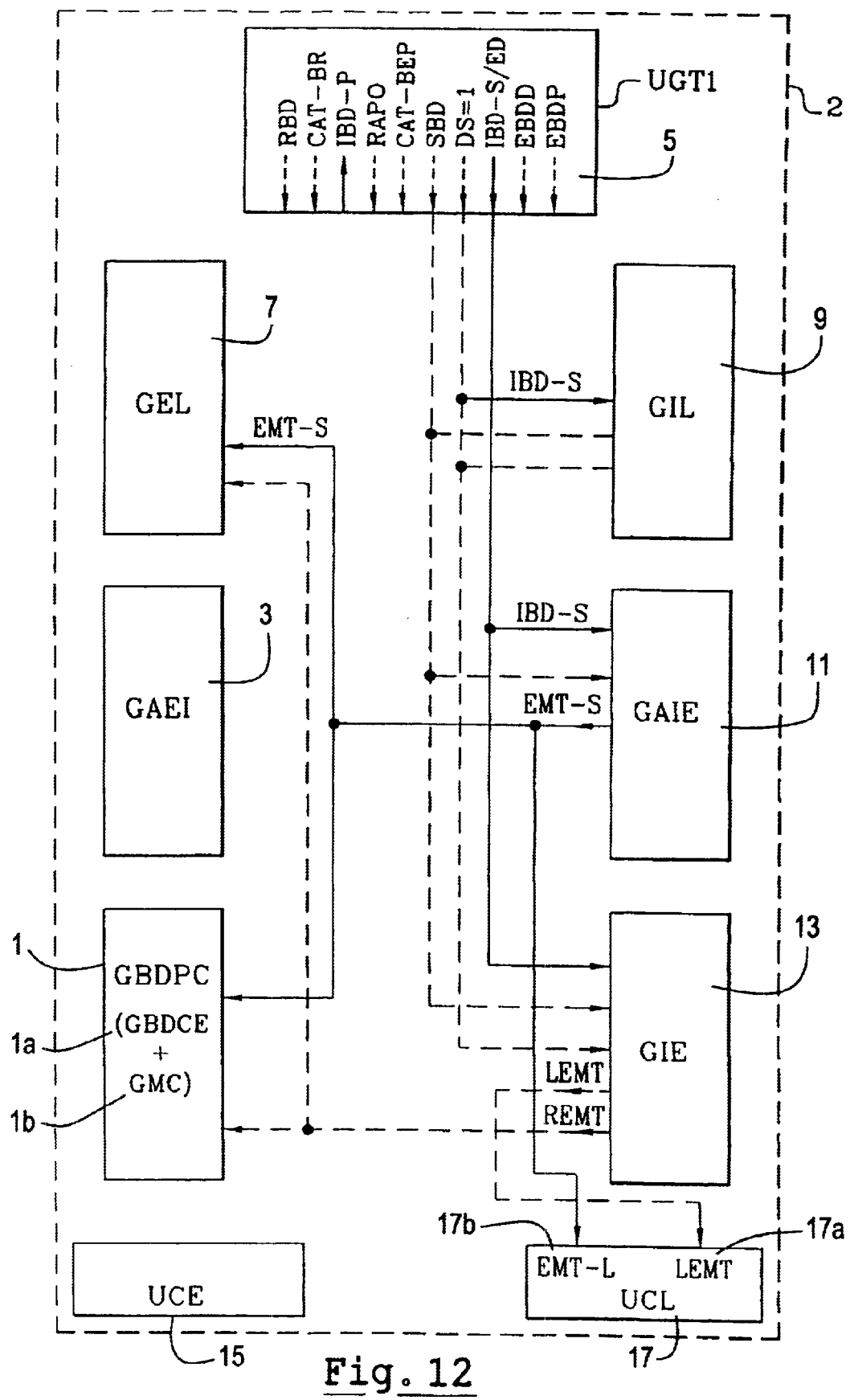
FIG. 12 shows exchanges of information between the units of the system at the time of a last BD service.

FIG. 12 shows the exchanges of information between the management units for this normal last BD service situation. The last BD service is characterized by the simultaneous presence of the control signals SBD (data block service) and DS (last service) supplied by the time management unit UGT1 5 and both active at "1".

The unit UGT1 5 transmits both these signals to the units GIL 9 and GIE 13 and only the signal SBD to the unit GAIE 11. The unit UGT1 5 also transmits the identifier code IBD-S of BD that is undergoing its last service to the units GAEI 3 and GAIE 11.

The processing effected in the unit GAIE 11 is identical to that described above in the case of service without release (see section 2 and FIG. 11); for conciseness, it will not be described again. The associated outgoing location code EMT-S is read using the incoming identifier code IBD-S and transmitted to the input EMT-L of the read control unit UCL 17 for addressing the buffer memory.

Figure 13:
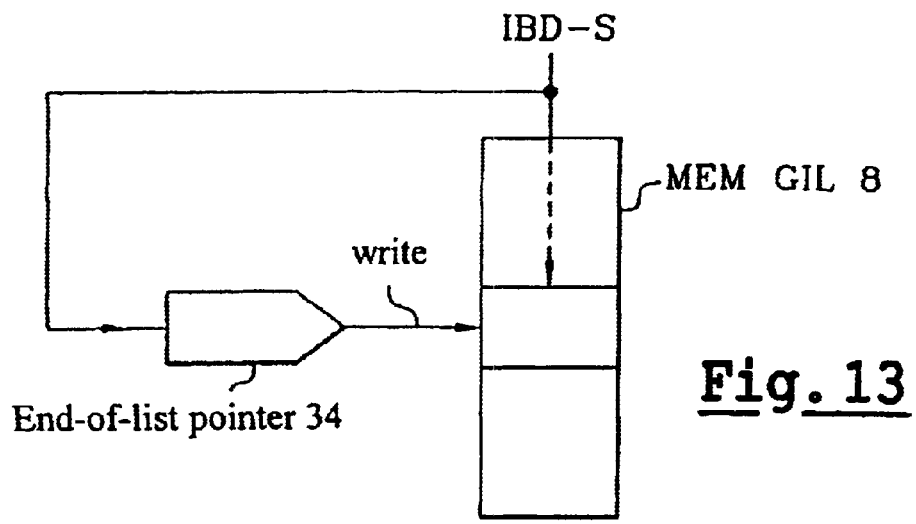
FIG. 13 is a diagram showing an operation of recording an identifier IBD that has just been freed as a free IBD in the unit GIL.

In the unit GIL 9, the identifier IBD of the freed BD is released. This operation, shown diagrammatically in FIG. 13, consists of adding the identifier IBD (designated IBD-S to the end of the chained list of free IBDs. To this end, the incoming identifier code IBD-S is applied to the input of the memory 8 and is written as an adjacent link at the address provided by the end-of-list pointer 34. The pointer 34 is then updated by writing the identifier code IBD-S in it as the new last free IBD in the list.

The processing carried out in the unit GIE 13 is similar to that described above in the case of service without release (see Chapter 2, FIG. 11): the processing is identical with regard to identifying the elimination flag BDNE associated with the serviced BD in the flag memory; however, it is different in terms of the logical processing carried out on the flag BDNE read in the memory 32, because in the present instance DS=1. The flag BDNE identified in the memory 32 using the address IBD-S of the BD serviced is then found to be at "1" (because a non-eliminated BD is assumed in this case). Because the signal SBD is active at "1", the outgoing control signal LEMT 17a at the output of the AND gate 34 is then active at "1" and is transmitted to the input LEMT 17a of the read control unit UCL 17 to validate reading of the BD to be serviced.

However, because the signal DS is now active at "1", the release EMT-signal REMT at the output of the AND gate 36 is active at "1". The control signal REMT=1 is transmitted to the unit GEL 7 and to the units GBDCE 1a and GMC 1b of the system GBDPC 1, respectively to release the location EMT of the BD, which becomes free, and which must be added to the chained list of free EMTs in GEL 7, and to remove that BD from its list of BDCEs in the unit GBDCE 1a, as explained below.

In the units GEL 7, GMC 1b and GBDCE 1a previously cited, the BD that is the subject of a release is processed, not on the basis of its identifier IBD, but on the basis of its location EMT. These units therefore receive the location code EMT-S of the BD from the unit GAIE 11, as shown in FIG. 12.

Figure 14:
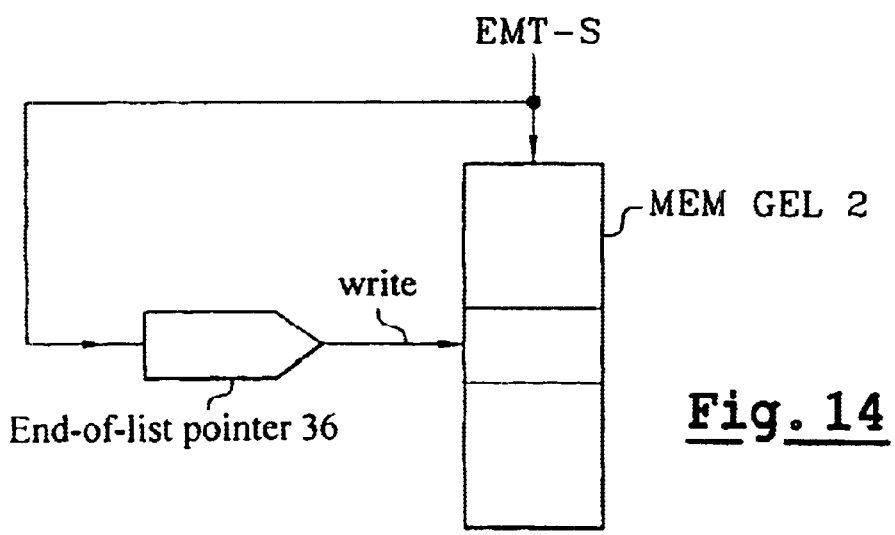
FIG. 14 is a diagram showing an operation of recording a location EMT that has just been freed as a free EMT in the unit GEL.

In the unit GEL 7, the location EMT occupied by the BD is released, so that the location in question, designated EMT-S, is freed. This operation, shown schematically in FIG. 14, consists of adding the location EMT-S to the end of the chained list of free EMT.

To this end, the incoming location code EMT-S is supplied at the input of the memory 2 and written as an adjacent link at the address provided by the end-of-list pointer 36. The pointer 36 is then updated by writing the location code EMT-S in it as the new last free EMT in the list.

Figure 15:
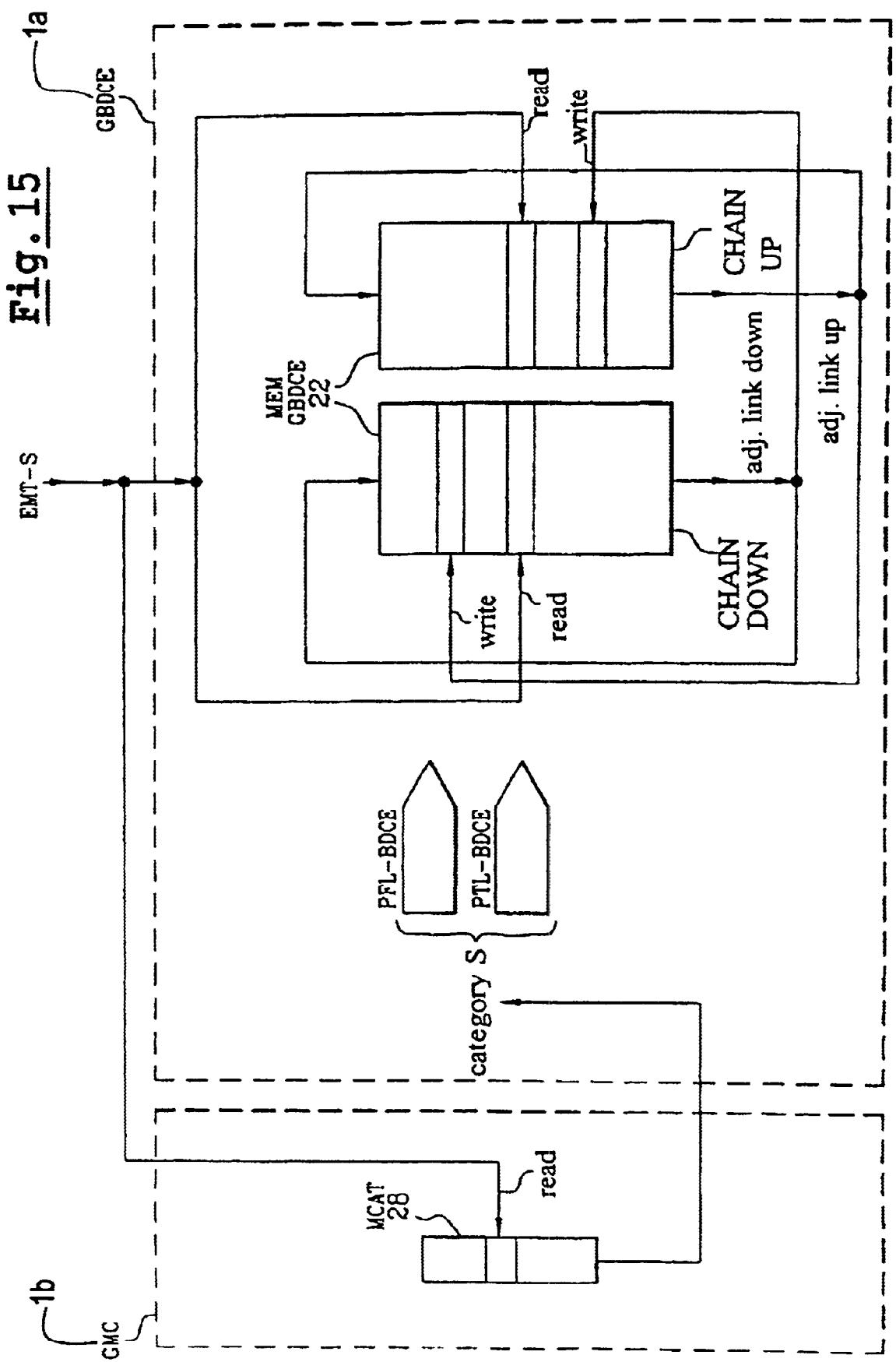
FIG. 15 is a diagram showing an operation of deleting the location address EMT of that BD in the system GBDPC shown in FIG. 1 in the event of releasing or eliminating a given BD.

FIG. 15 shows the operation, in the units GMC 1b and GBDCE 1a of the system GBDPC 1, of eliminating the location EMT (here designated EMT-S) in the list of BDs cleared for elimination (BDCEs) to which the released BD belongs. The incoming location code EMT-S is first used in the unit GMC 1b to identify the category CAT-S to which that BD belongs. To this end, the category is read in the line corresponding to the address EMT-S in the memory MCAT 28. The category code CAT-S identified for the released BD shows whether that BD was written as a BD cleared for elimination (BDCE) in one of the C lists of BDCEs managed by the unit GBDCE 1a, and if it was, in which case the category code CAT-S is transmitted to the unit GBDCE 1a, in which list of BDCEs it was written,.

In the unit GBDCE 1a, eliminating the entity EMT-S from the (double chained) list of BDCEs concerned consists firstly of reading in both parts (downstream chaining and upstream chaining) of the memory 22 the line corresponding to the location address EMT-S (arrow 38) to identify the downstream and upstream adjacent links relating to that location EMT-S, respectively in the downstream chaining and upstream chaining parts of the memory 22. The direct adjacent links are then established between the location addresses EMT identified in this way (next EMT and preceding EMT in the chained list), on either side of the location EMT-S deleted from the list in this way. To establish the new downstream adjacent link, from the preceding EMT to the next EMT, the code of the next EMT is written in the downstream chaining part of the memory 22 at the address of the preceding EMT.

Conversely, to establish the new upstream adjacent link, from the next EMT to the preceding EMT, the code of the preceding EMT is written in the upstream chaining part of the memory 22 at the address of the next EMT.

Note that, in the general case previously described in which the location EMT-S of the released BD is somewhere inside a chained list of BDCEs, the elimination operation can in fact be effected without needing any category code CAT-S in the situation in which—as assumed here—a single common memory 22 is used to manage all of the C chained lists of BDCEs (on the other hand, if a dedicated link memory is used for each of the C chained lists of BDCEs, it would then be necessary to select the particular link memory used to manage the list corresponding the category CAT-S). On this assumption, the unit GBDCE 1a nevertheless needs to know the category code CAT-S for situations in which the location EMT-S is either at the head of the list or at the end of the list, or at the head and the end of the list (in the case of a list including only one entity EMT, namely EMT-S), in order to be able to select and update the appropriate pair of pointers 24s/26s relating to the category CAT-S of the released BD from the C pairs of pointers (not shown in FIG. 15).

4. Last Service of a Data Block (DS=1) with Release of IBD Only.

This second instance of last BD service is encountered if the BD to which the last service relates has been eliminated prematurely (BDNE=0), i.e. a BD that has already been freed from its location EMT but has retained its identifier IBD up to the last service of the eliminated BD (to avoid the need for a rearrangement, as already explained).

The exchanges of information between the various units are substantially the same as for the normal situation of the last service of a non-eliminated BD with release of EMT and IBD (see Chapter 3); thus FIG. 12 is referred to again.

Note first that the units GAIE 11 and GIL 9 perform the same operations relating to the identifier IBD-S of the serviced BD as in the normal situation of last service with release of EMT and IBD, namely: freeing the identifier IBD-S in the unit GIL 9 and identifying the location EMT-S associated with the identifier IBD-S in the unit GAIE 11 (although this identification operation is of no utility in this situation, a simple solution consists of allowing this operation to take place even if there is no need for the code EMT-S; this avoids adding in the unit GAIE 11 an additional restriction on enabling (SBD=1) this operation). These operations have already been described (see Chapter 3) and for conciseness are not described again.

The unit GIE 13 performs an operation similar to identifying the status of the elimination flag BDNE, in the memory 22, on the basis of the identifier IBD-S (see FIG. 11), but with a different result in the present instance, because the flag BDNE is in the state BDNE=0. Also, the output of the gate 34 supplies a read control signal LEMT 17a which is inactive at "0", in which case reading of the buffer memory at the address EMT-S (not used in this case) is not validated in the unit UCL 17. Also, the output of the gate 36 supplies a release control signal REMT that is inactive at "0", in which case no EMT release at the address EMT-S is validated in the units GEL 7 and GBDCE 1a (again not used in this case).

5. Elimination of a given BD.

This operation concerns eliminating a given BD from the buffer memory, at the command of the time management unit UGT1 5, whatever the reason for that elimination, for example to delete an incorrect BD. It can therefore concern all possible BD categories. Eliminating a given BD, designated by its identifier IBD, involves marking the elimination flag of that BD in the eliminated BD state (BDNE=0) in the unit GIE 13, freeing the location EMT occupied by that BD in the unit GEL 7, and possibly deleting the location EMT occupied by that BD from the list of BDs cleared for elimination relating to the category to which that BD belongs; the last two operations therefore involve identifying, in the unit GAIE 11, the location EMT occupied by that BD designated by its associated identifier IBD beforehand.

Figure 16:
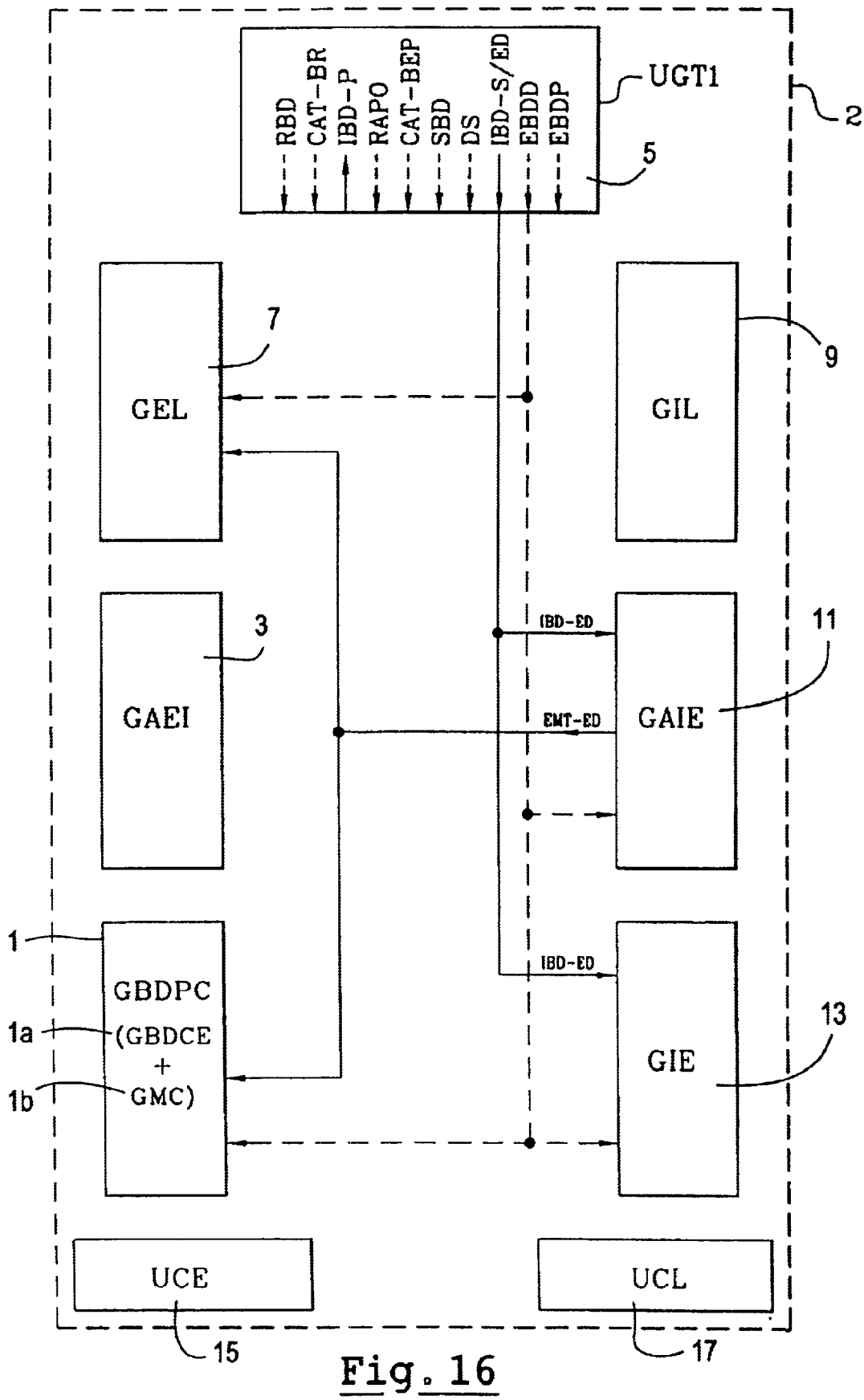
FIG. 16 shows exchanges of information between the units of the system in the event of eliminating a given BD.

FIG. 16 shows the exchanges of information between the various units. The elimination of a given BD is commanded by the unit UGT1 5 by activating the outgoing control signal EBDD for eliminating a given BD at "1". That signal is transmitted to the units GAIE 11, GIE 13 and GEL 7, and to the units GBDCE 1a and GMC 1b of the system GBDPC 1, to activate the elimination operation therein. The unit UGT1 5 transmits the outgoing identifier IBD of the BD to eliminated (designated IBD-ED) to the units GIE 13 and GAIE 11.

Figure 17:
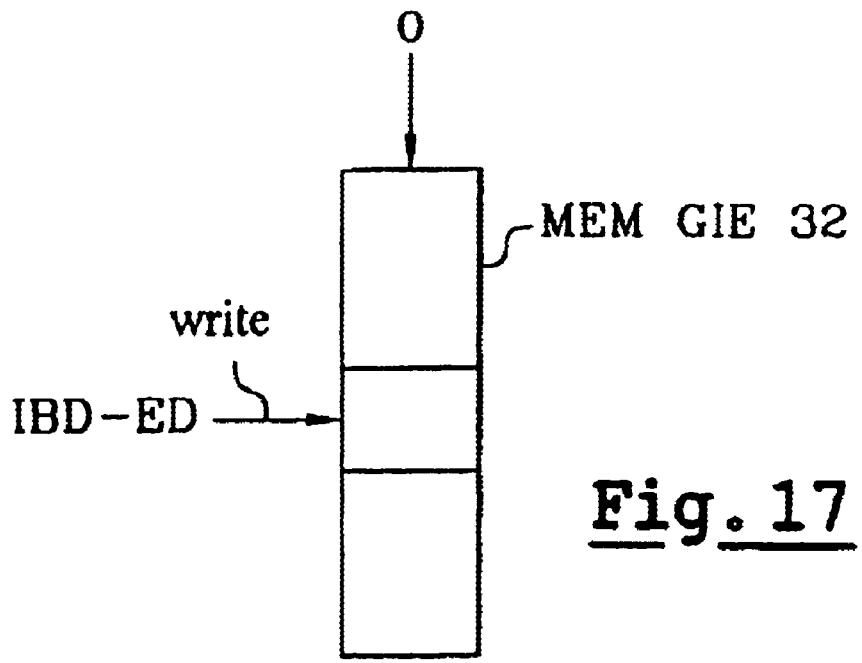
FIG. 17 is a diagram showing an operation of marking an elimination flag in the eliminated BD state in the unit GIE in the event of eliminating a BD.

In the unit GIE 13, the elimination flag of the eliminated BD is marked in the state BDNE=0, to store the fact that the BD in question is now in the eliminated state. To this end, as shown in FIG. 17, a flag logic value BDNE=0 is written in the flag memory 32 at the address corresponding to the received identifier IBD-ED.

In the unit GAIE 11, the address of the location EMT occupied by the eliminated BD (designated EMT-ED) is identified from its received identifier IBD-ED by reading the relation memory 18, as previously described with reference to FIG. 10 (see Chapter 2). The location address code EMT-ED obtained in this way is transmitted to the units GEL 7, GMC 1b and GBDCE 1a.

In the unit GEL 7, the location EMT-ED occupied by the eliminated BD is freed and the freed location EMT-ED is added to the end of the chained list of free EMT. To this end, the same operation is carried out as previously described with reference to FIG. 14 (see Chapter 3), substituting EMT-ED for the location code EMT-S.

In the units GMC 1b and GBDCE 1a of the system GBDPC 1, the category to which the eliminated BD belongs is identified first, and if the BD belongs to a category of BD cleared for elimination its location EMT-ED is eliminated in the list of BDs cleared for elimination (BDCEs) corresponding to its identified category (note that it is possible to force the elimination of a given BD, even if it does not belong to a BDCE category). To this end, the incoming location code EMT-ED of the eliminated BD is used first in the unit GMC 1b to identify the category CAT-ED to which the eliminated BD belongs. If the category code CAT-ED indicates that it is one of the C categories of BDCE, the location EMT-ED of the BD is then removed from the chained list of BDCEs corresponding to the category CAT-ED in the unit GBDCE 1a. This is therefore the same operation as that previously described with reference to FIG. 15 (see Chapter 3), substituting EMT-ED for the location code EMT-S and CAT-ED for the category code CAT-S.

6. Eliminating a BD cleared for elimination in a given category.

This type of elimination can be used if the management system seeks to force the freeing of a location EMT in the buffer memory by eliminating a BD cleared for elimination belonging to a given category CAT-BEP=i. This kind of operation is carried out, for example, in anticipation of imminent congestion for BDs belonging to a category higher than the category i of the BD that is eliminated to make room for it.

Figure 18:
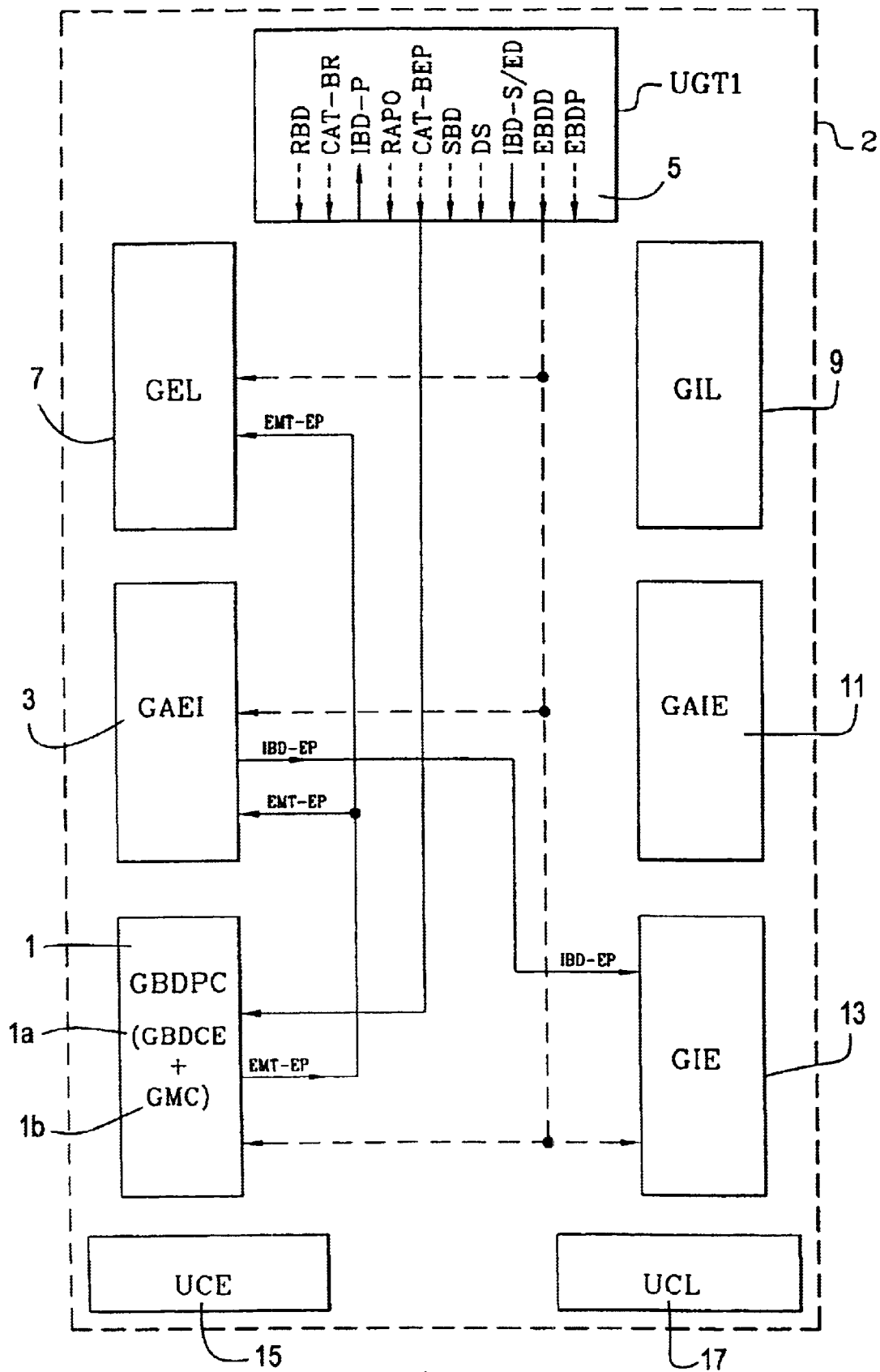
FIG. 18 shows exchanges of information between the units of the system in the event of eliminating a selected BDCE in a given category.

FIG. 18 shows the exchanges of information between the various units. The elimination of a BD cleared for elimination (BDCE) of category CAT-BEP=i is commanded by the unit UGT1 5 by activating the outgoing control signal EBDP at "1" and supplying the outgoing BD to be eliminated category code CAT-BEP. The category code CAT-BEP=i is transmitted only to the unit GBDCE 1a of the system GBDPC 1 and the control signal EBDP is transmitted to the units GIE 13, GEL 7, GAEI 3 and GBDCE 1a. Note that, unlike the previous situation, the unit UGT1 5 does not designate the identifier of the BD that will be eliminated, but only the category in which a BDCE must be selected by the unit GBDCE 1a itself from the set of all BDCEs belonging to the required category CAT-BEP=i. If a chained list management method is used, the BDCE selected is the first one, which appears at the head of the list of BDCEs corresponding to the category specified by the code CAT-BEP.

The operations effected in the unit GBDCE 1a of the system GBDPC 1 are described next with reference to FIG. 18.

The category code CAT-BEP supplied by the unit UGT1 5 enables the unit GBDCE 1a to select directly the pair of pointers 24i/26i relating to the chained list of BDCEs corresponding to the category CAT-BEP=i (in this instance, no operation is therefore performed in the unit GMC 1b). The address code of location EMT of the selected BDCE (designated EMT-EP) is found to be the first one at the head of the chained list of BDCEs of category CAT-BEP=i, and is therefore designated by the PTL-BDCE head-of-list pointer 261, which supplies the outgoing location code EMT-EP transmitted to the units GEL 7 and GAEI 3. To update the chained list, the head-of-list pointer 26i reads the downstream chaining part of the memory 22 to identify the downstream adjacent link to the next EMT from the list, the code of that next EMT being written in the head-of-list pointer 26i as the new address of the first location EMT at the head of the list of BDCEs.

In the unit GEL 7, the location EMT-EP occupied by the BD selected for elimination is freed and the freed location EMT-EP is added to the end of the chained list of free EMTs. This operation is identical to that described with reference to FIG. 14 (see Chapter 3), substituting EMT-EP for the location code EMT-S.

Figure 20:
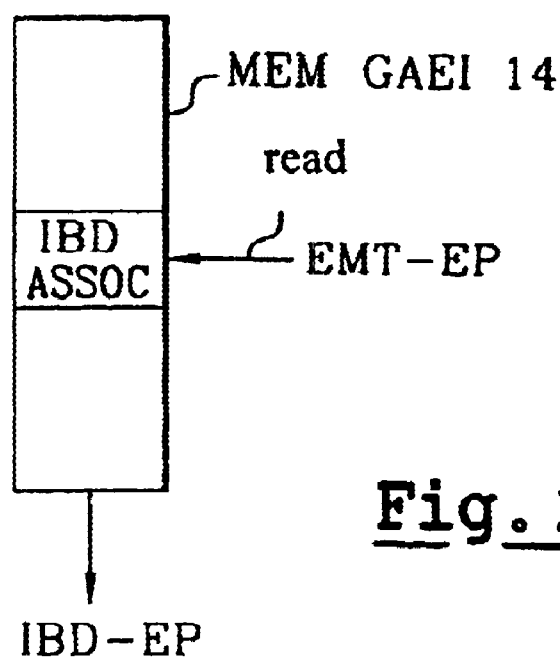
FIG. 20 is a diagram showing an operation, in the unit GAEI, of identifying the identifier IBD associated with a location EMT.

The unit GAEI 11 identifies the identifier IBD-EP that is associated with the location address EMT-EP transmitted by the unit GBDCE 1a. As shown in FIG. 20, the incoming location code EMT-EP reads the identifier code IBD-EP associated with that location EMT-EP in the relation memory 14 of the unit GAEI 3, in accordance with the EMT→IBD relation stored beforehand on receiving the BD, as described with reference to FIG. 5 (see Chapter 1). The outgoing identifier code IBD-EP is transmitted to the unit GIE 13.

In the unit GIE 13, the elimination flag of the BD, which is designated by its identifier code IBD-EP, is marked in the state BDNE=0 to store the fact that the BD selected for elimination is now in the eliminated state. That operation is identical to that described with reference to FIG. 17, substituting IBD-EP for the identifier code IBD-ED.

7. Reception of BD with Substitution (Push-out).

Compared to normal BD reception, i.e. without substitution (see Chapter 1), BD reception with substitution consists of storing the received new BD in the buffer memory, not in a free location (EMT-R, normally supplied by the unit GEL 7), but in a location EMT freed for this purpose (EMT-EP) by eliminating a BD cleared for elimination (BDCE) in a category CAT-BEP specified by the unit UGT1 5. The expression BD substitution (push-out) means that the received new BD replaces the BD eliminated in the buffer memory. It is therefore a question of combined elimination of a BDCE in a given category and reception of a received new BD at the buffer memory location that was previously occupied by the eliminated BD. As a general rule, the eliminated BD is selected in a category of BDCE lower than that of the received BD.

Accordingly, BD reception with substitution necessitates combined execution of:

on the one hand, BD elimination consequent upon previous selection of a BDCE in a required BD category CAT-BEP; and on the other hand, new BD reception.

Figure 21:
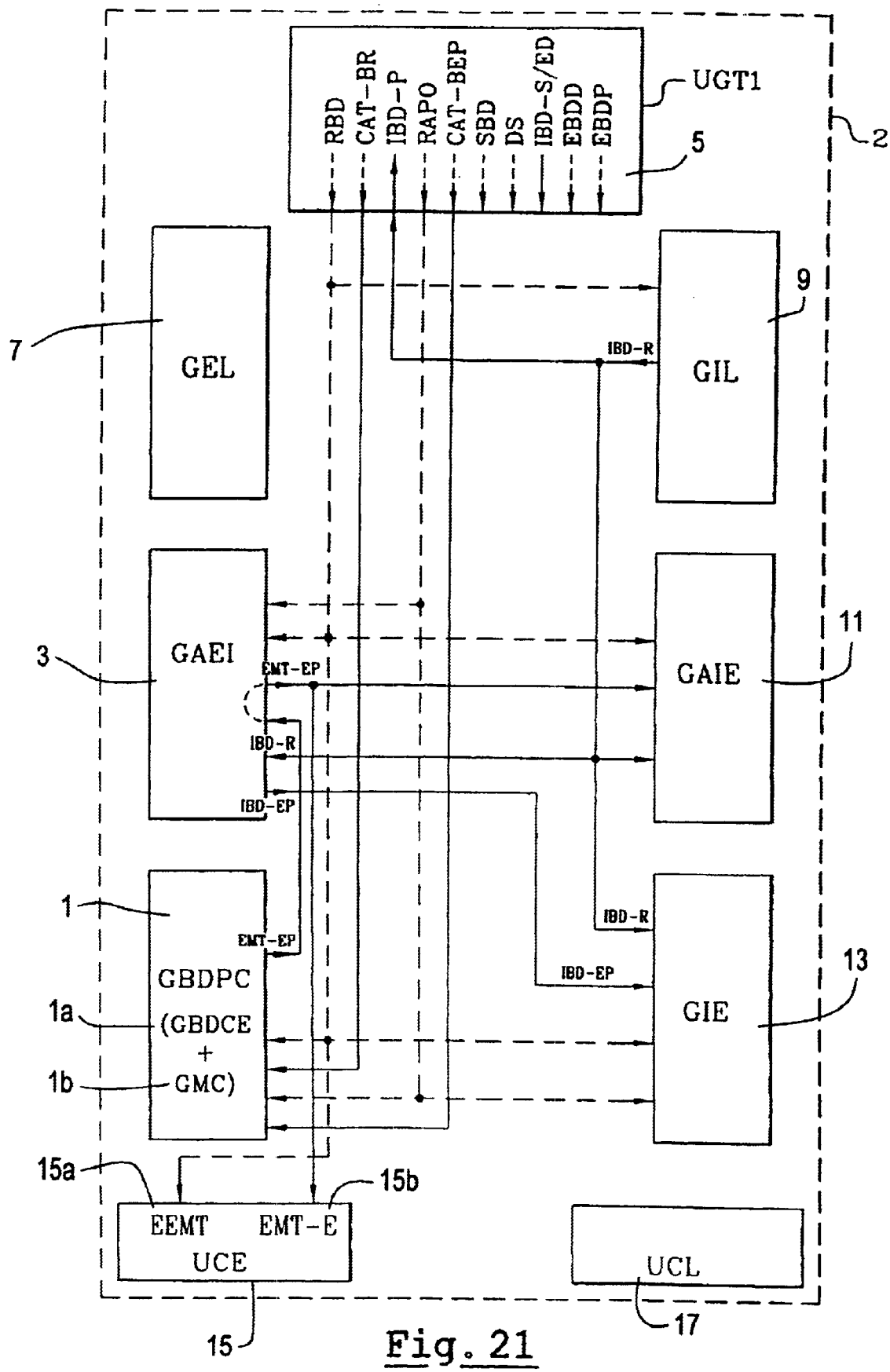
FIG. 21 shows exchanges of information between the units of the system in the even of BD reception with substitution (push-out)

FIG. 21 shows the exchanges of information between the various units. BD reception with substitution is characterized by the simultaneous presence of the control signals RBD and RAPO, both active at "1", at the output of the time management unit UGT1 5.

The signal RBD=1 is transmitted to all the units of the management system, i.e. the units GEL 7, GIL 9, GAEI 3, GAIE 11 and GIE 13, and to the units GMC 1b and GBDCE 1b of the system GBDPC 1, as well as to the input EEMT 15a of the write control unit UCE 15; the signal RAPO=1 is transmitted to the units GEL 7, GAEI 3 and GIE 13 and to the units GMC 1 and GBDCE 1a of the system GBDPC 1.

In addition to the control signals RBD=1 and RAPO=1, the unit UGT1 5 supplies the following codes only to the units GMC 1b and GBDCE 1a of the system GBDPC 1:

CAT-BR, which indicates the category (j) of the BD currently being received, i.e. of the BD that will be substituted for the eliminated BD; and CAT-BEP, which indicates the category (i) of BD cleared for elimination (BDCE) required for selecting a BD to be eliminated.

In response to the control signals previously cited, the units GMC 1b and GBDCE 1a of the system GBDPC 1 perform a series of operations described next with reference to FIG. 22.

Figure 19:
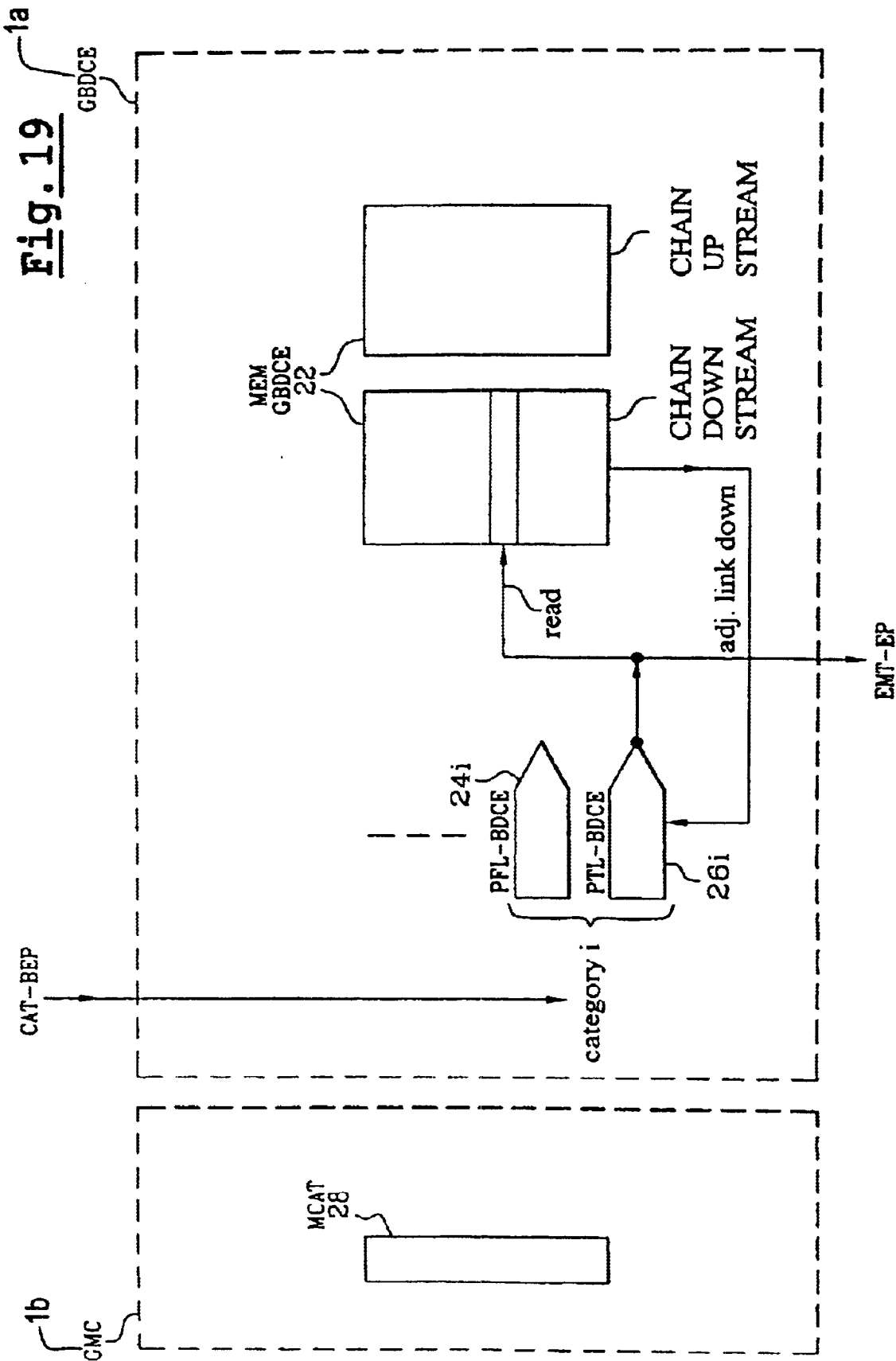
FIG. 19 is a diagram showing an operation of eliminating the location EMT of a BD in the corresponding list of BDCEs managed in the system GBDPC in the event of eliminating a selected BDCE in a given category.

First of all, from the subset of BDCEs belonging the required category CAT-BEP=i, the unit GBDCE 1a selects the first BDCE at the head of the chained list of BDCEs corresponding to that category, designated by the code CAT-BEP, as the BD selected for elimination designated by the location EMT-EP. The category code CAT-BEP supplied by the unit UGT1 5 enables direct selection of the pair of pointers 24i/26i relating to the chained list of BDCEs corresponding to the category CAT-BEP=i. The head-of-list pointer PTL-BDCE 26i then supplies the location address code EMT-EP of the BD selected for elimination, and that chained list is then updated as described with reference to FIG. 19 (see Chapter 6).

The location code EMT-EP is transmitted to the unit GAEI 3. In response, the unit GAEI 3 identifies the identifier IBD-EP associated with the location EMT-EP of the BD eliminated by carrying out an operation identical to that already described with reference to FIG. 20.

The identifier code IBD-EP identified by the unit GAEI 3 is transmitted to the unit GIE 13 to mark therein the elimination flag of the eliminated BD, designated by the identifier code IBD-EP, in the state BDNE=0. This operation is the same as that previously described with reference to FIG. 17, substituting IBD-EP for the identifier code IBD-ED of that figure.

All of the operations just described for BD reception with substitution relate to the prior elimination of a BD to make room for the received new BD. In fact, these operations are similar to those already described in the context of simple elimination of a BD in a given category. Thereafter, and/or in parallel therewith, the operations specific to receiving the received new BD, which is substituted in the freed location EMT, are preformed; those operations are described next.

As soon as the signal RBD is received, the unit GIL 9 selects a free identifier IBD to assign it to the received new BD and sends the unit UGT1 5 this identifier (designated IBD-R) associated with the BD currently being received. This operation is identical to that described previously with reference to FIG. 4 (see Section 1) and for conciseness is not described again.

As for normal BD reception, the identifier code IBD-R is also transmitted:

to the unit GAEI 3, so that it can store the EMT→IBD relation, by storing the identifier code IBD-R in the memory line corresponding to the location address assigned to the new BD, here the location EMT-EP that has just been freed by elimination and which is supplied by the unit GBDCE 1a (dashed lines in the box GAEI 3 in FIG. 21); this operation is identical to that previously described with reference to FIG. 5, substituting EMT-EP for the location code EMT-R;

to the unit GAIE 11, so that it can store the IBD→EMT relation, by storing the location code EMT-EP assigned to the new BD in the memory line corresponding to the identifier IBD-R assigned to that BD, by means of an operation identical to that described with reference to FIG. 6, substituting EMT-EP for the location code EMT-R; and to the unit GIE 13 to initialize therein the elimination flag of the new BD, designated by its identifier IBD-R, to the non-eliminated state (BDNE=1), by means of an operation identical to that described with reference to FIG. 8.

In FIG. 21, the location code EMT-EP transmitted by the unit GAEI 3 is intended not only for the unit GAIE 11 but also:

for the units GMC 1b and GBDCE 1a of the system GBDPC 1, for storing, in the unit GMC 1b, the category CAT-BR=j of the new BD, and where applicable, for storing the received BD in the unit GBDCE 1a in the list of BDs cleared for elimination corresponding to its category CAT-BR; and for the write control unit UCE 15, as the address of the location at which the new BD is written in the buffer memory.

Note that it is of course exactly equivalent to transmit the code EMT-EP to all the units concerned directly from the unit GBDCE 1a of the system GBDPC 1.

The units GMC 1b and GBDCE 1a of the system GBDPC 1 then perform an operation similar to that performed in the case of normal BD reception (see FIG. 22):

on the one hand, the EMT→category relation is stored in the unit GMC 1b, by writing the category CAT-BR=j of the BD received in the relation memory MCAT 28 at its location address EMT-EP, and on the other hand, if the category CAT-BR of the new BD corresponds to one of the C categories of BDCE, the new BD is added as a BDCE to the chained list of BDCEs of its category in the unit GBDCE 1a, by selecting the end-of-list pointer 24a of that category CAT-BR, and in order to add the new BD at the end of the chained list, by means of an operation identical to that described with reference to FIG. 7 (see Chapter 1).

Figure 22:
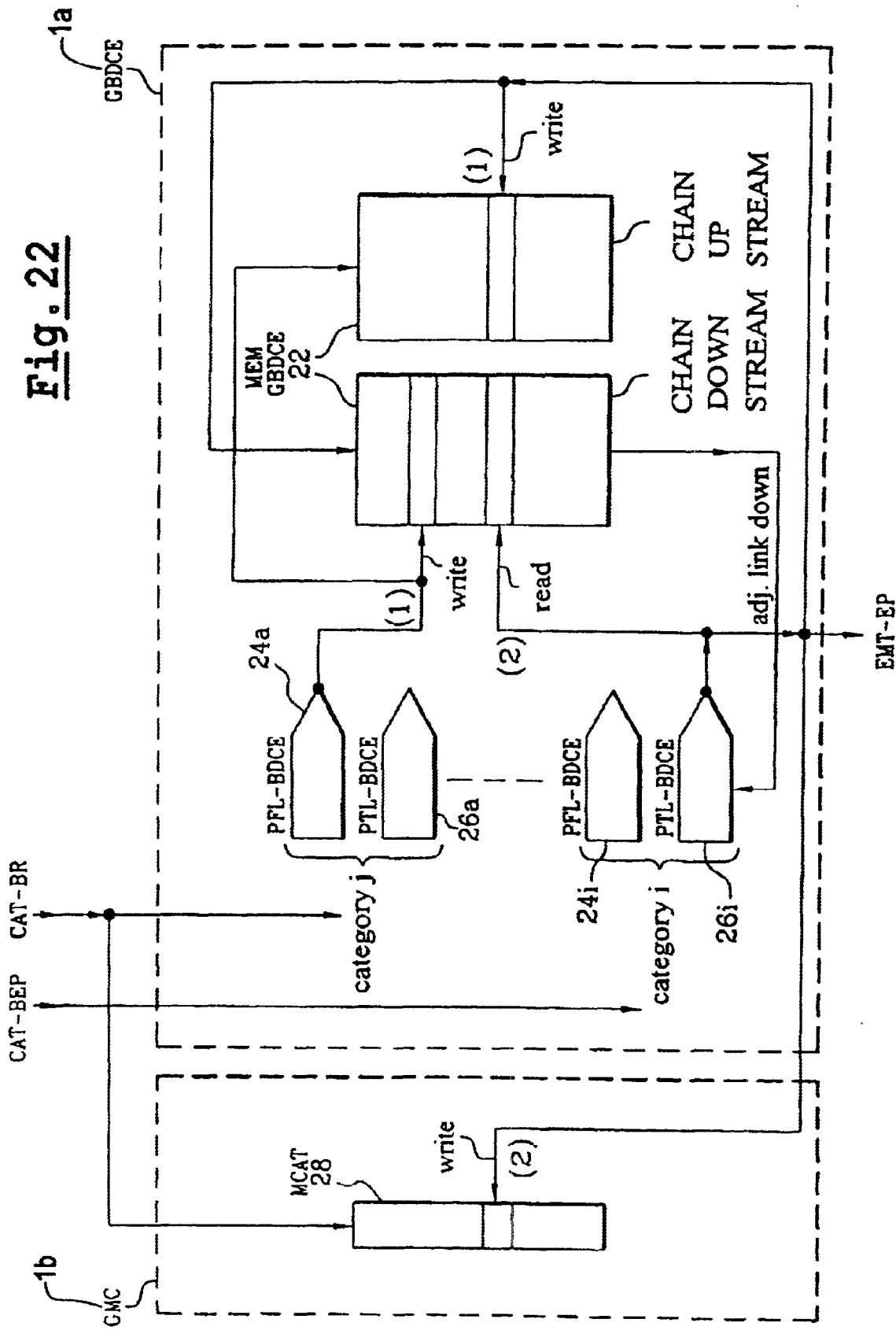
FIG. 22 is a diagram showing the operations effected in the units GBDCE and GMC of the system GBDPC in the event of BD reception with substitution (push-out)

In FIG. 22, the specific operations relating to BD elimination, on the one hand, and to new BD reception, on the other hand, are respectively designated (1) and (2).

As in the case of normal BD reception, the location code assigned to the received new BD, here EMT-EP, is also supplied to the input EMT-E 15b of the unit UCE 15 in order to write that BD therein.

Many variants of the operations described in Chapters 1 to 7 are feasible that do not depart from the scope of the present invention, and can relate to the definition and the structure of the information exchanged between the units and/or to the configuration of the units. One of these variants, which achieves a significant saving in the volume of memory required, groups the functions of the units GEL 7 and GAEI 3 around one common memory and the functions of the units GIL 9 and GAIE 11 around another common memory.

This is because, in theory, the chained list of free locations EMT in the unit GEL 7 does not occupy lines that correspond to occupied locations EMT. On the contrary, the association memory of the unit GAEI 3 is used only for occupied locations EMT. It is therefore possible to exploit this exclusive use of the locations EMT by providing for the units GEL 7 and GAEI 3 only one common memory with as many lines as there are EMT locations in the buffer memory. The common memory for the GEL 7 function is associated with a pair of pointers for managing the chained list of free EMTs, as in the situation already described of a separate unit GEL 7.

Similarly, in theory, the chained list of free IBDs in the memory of the unit GIL 9 does not occupy lines that correspond to occupied identifiers IBD. In this case, each line that corresponds to an occupied identifier IBD can be used to store the location address EMT corresponding to an occupied identifier IBD.

Figure 23:
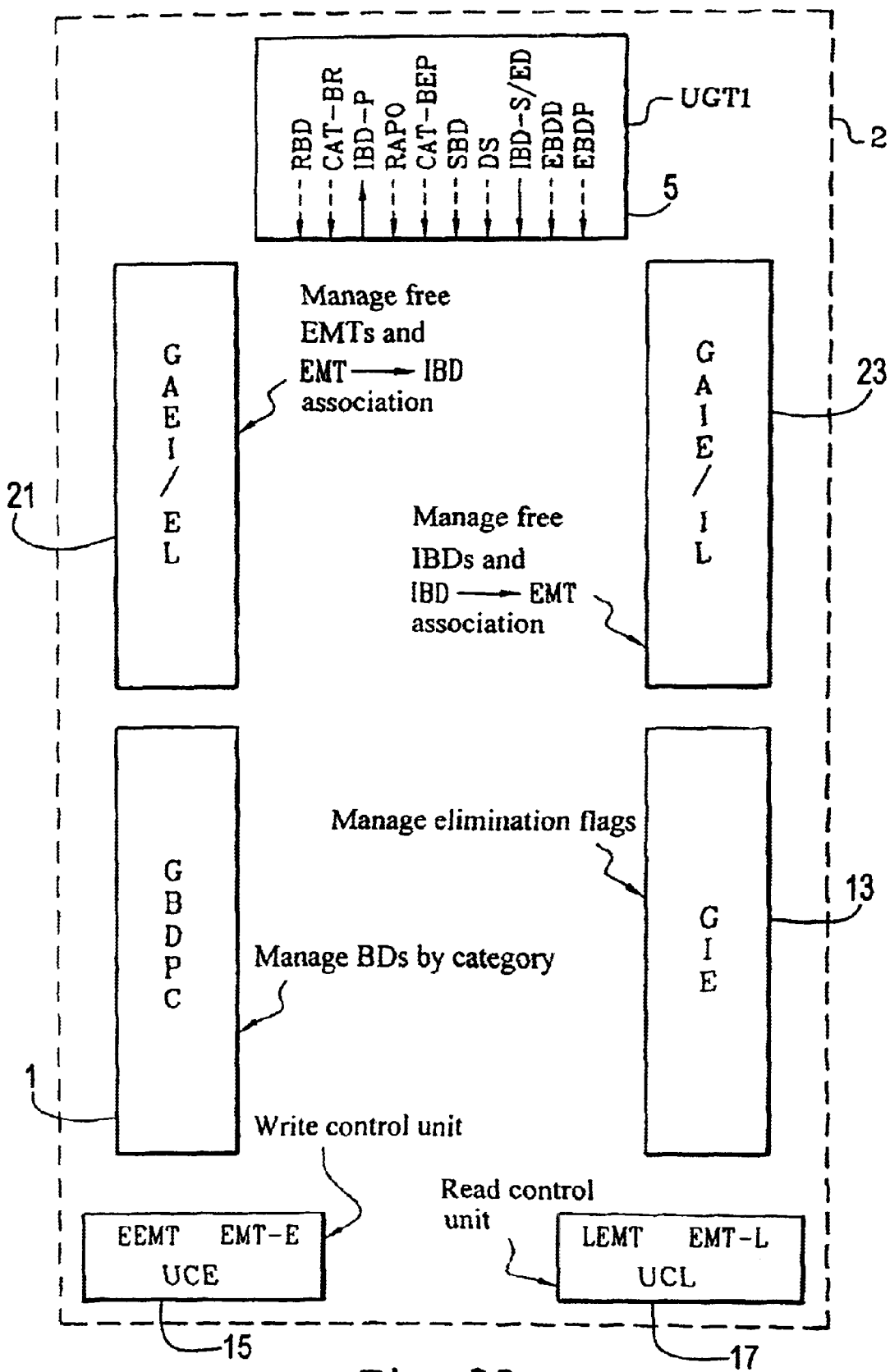
FIG. 23 is an overall block diagram of units of a different embodiment of the management system according to the present invention.

FIG. 23 is an overall block diagram of this variant of the BD management system. This diagram differs from the FIG. 1 diagram essentially in that the EMT→IBD association management functions and free EMT management functions are effected in a hybrid unit GAEI/EL 21 and, likewise, the IBD→EMT association management and free EBD management functions are executed in a hybrid unit GAIE/IL 23. The tasks performed in the hybrid units GAEI/EL 21 and GAIE/IL 23 to execute the operations concerned are similar to those performed by the separate units GEL 7, GAEI 3, GIL 9 and GAIE 11. In each hybrid unit, appropriate multiplexing of the information enables management of access to their common memory for reading and writing.

As previously explained, in one variant of the present invention, relating to the unit GBDCE 1a for managing BDs cleared for elimination, the single memory 22 that manages all the chained lists relating to the C categories of BDs cleared for elimination (BDCEs) is replaced by C memories. Each of the C memories then manages a single chained list of BDCEs relating to a given category, in association with the pair of pointers (head-of-list pointer and end-of-list pointer) of that double-chained list. Depending on the BDCE category concerned, selecting the pair of pointers in the unit GBDCE 1a is then replaced by selecting the appropriate memory with its associated pair of pointers.

In the description, the subsets of entities of the units GEL 7, GIL 9 and GBDCE 1a are managed using the conventional chained list technique. However, other methods of managing subsets of entities are clearly feasible that do not depart from the scope of the invention. For example, it is possible to envisage the use of FIFO memories or FFO registers.

Whichever variant is adopted, as explained in connection with the management units GMC 1b and GBDCE 1a of the system GBDPC 1, it is equally possible to designate the data blocks BD indirectly by means of their identifiers IBD instead of their locations EMT. In this case, it is not necessary to manage the EMT→IBD relation and the unit GAEI 3 can be dispensed with.

Compared to the solution described for the units of the system GBDCE 1a based on the locations EMT, in this kind of alternative, based on the identifiers IBD, the signals EMT-R and EMT-EP are respectively replaced by IBD-R and IBD-EP in all operations in which the units GMC 1b and GBDCE 1a are involved. Accordingly, the main differences in the operation of the buffer memory management system are briefly described hereinafter for each of the basic operations discussed in the foregoing Chapters 1 to 7.

Normal reception of BD (without substitution): The unit GBDCE 1a receives the identifier IBD-R associated with the BD received directly from the unit GIL 9, so that it can manage the new BD as a function of its category.

Service of a data block (SBD=1) without release (DS=0): This operation does not involve the units GMC 1b and GBDCE 1a of the system GBDPC 1; consequently, it is strictly identical to the analogous operation described in Chapter 2.

Last service of a data block (DS=1) with release of EMT and IBD: The units GMC 1b and GBDCE 1a of the system GBDPC 1 receive the identifier IBD-S of the serviced BD directly from the unit UGT1 5 instead of receiving its location code EMT-S from the unit GAIE 11.

Last service of a data block (DS=1) with release of IBD only: As for the preceding case, the units GMC 1b and GBDCE 1a of the system GBDPC 1 receive the identifier IBD-S of the serviced BD from the unit UGT1 5 instead of receiving its location code EMT-S from the unit GAIE 11.

Elimination of a given BD: Similarly, the units GMC 1b and GBDCE 1b of the system GBDPC 1 receive the identifier IBD-S of the serviced BD directly from the unit UGT1 5 instead of receiving its location code EMT-S.

Elimination of a BD cleared for elimination in a given category: The unit GAIE 11 further receives, on the one hand, the control signal EBDP=1 from the unit UGT1 5 and, on the other hand, the identifier code IBD-EP of the BDCE selected for elimination from the unit GBDCE 1a, so that it can identify the location EMT-EP corresponding to that identifier IBD-EP and transmit that location code EMT-EP to the unit GEL 7. Also, it is the unit GBDCE 1a that transmit the identifier IBD-EP directly to the unit GIE 13 so that it can mark the corresponding BD as being in the eliminated state.

BD reception with substitution (push-out): With regard to the stage of selecting a BDCE, the unit GAIE 11 further receives, on the one hand, the control signal RAPO=1 from the unit UGT1 5 and, on the other hand, the identifier code IBD-EP of the BDCE selected for elimination from the unit GBDCE 1a, so that it can identify the location EMT-EP corresponding to the identifier IBD-EP and transmit the location code EMT-EP to the unit UCE 15; also, it is the unit GBDCE 1a that transmits that identifier IBD-EP to the unit GIE 13 so that it can mark the corresponding BD as being in the eliminated state. With regard to the BD reception stage, the unit GBDCE 1a receives the identifier IBD-R associated with the received new BD directly from the unit GIL 9.

Other variants of the invention are equally feasible for the simplest priority management applications, in which only n=2 BD priority categories (high priority and low priority) are distinguished, and where only low-priority BD can be eliminated, in which case it is sufficient to manage a single category of BDs cleared for elimination (C=1), namely low-priority BDs. In this particular case, the category marking management unit GMC 1b stores a category code for each BD using only one bit (indicating high priority or low priority) and the unit GBDCE 1a for managing BDs cleared for elimination manages only one list of BDCEs (of low priority), for example using a single chained list. Note also that, in the event of an operation involving the elimination of one of the low-priority BDs (as an isolated operation or in the event of BD reception with substitution), the unit UGT1 5 no longer needs to provide the code CAT-BEP designating the required BDCE category, since in this case it is always that of the low-priority BDs.

Finally, as in the patent application previously cited, the invention can have further variants if each location address EMT can be associated with only a restricted number of block identifiers IBD. These variants lead to implementations that are more optimized in terms of memory space required, subject however to some reduction of performance, as explained below.

Consider, by way of example, the simple case in which each location address EMT can have only two possible associated values of the identifier IBD, designated IBD-A and IBD-B. Simplified coding of those two values of the identifier IBD consists of using as a base the EMT address code, to which an identifier code bit (CI) is added characterizing the first or the second possible associated value identifier IBD (CI=0 or 1, respectively, for IBD-A or IBD-B). This simplifies managing free locations EMT, free identifiers IBD and the relations between EMT and IBD for the BDs present in the buffer memory, using three status bits for each address EMT:

one bit (IEMT) indicating if the location EMT is occupied by a BD or not;

one bit (IIA) indicating if the first associated identifier value IBD-A is free or used for a BD; and one bit (IIB) indicating if the second associated identifier value IBD-B is free or used for a BD.

Using a restricted number of possible identifier values for each EMT introduces some restrictions as to the availability of each location EMT in the buffer memory, i.e. its capacity to receive a new BD, in that this necessitates at least one of its two possible associated identifier values to be available itself. This condition is necessary for a location EMT not occupied by a BD to be really available or for a location EMT occupied by a BD cleared for elimination to be effectively usable for BD substitution.

The situation in which a location EMT cannot be made available because its two possible associated identifier values (IBD-A and IBD-B) are unavailable at the time can exist temporarily if two premature BD eliminations have been effected successively at the same location EMT and neither of the two identifier values that were associated with the eliminated BDs has been freed in the meantime. The existence of this situation, which is highly improbable, although not impossible, significantly increases the probability of BD loss in the buffer memory.

Compared to the first solution described for the system 2, management units similar to the units GIE 13, GMC 1b and GBDCE 1a are also used for a variant of this kind. On the other hand, the management functions of the units GEL 7, GIL 9, GAEI 3 and GAIE 11 can be optimized by replacing them with:

an available location EMT management unit (GED), and an EMT/IBD availability status management unit (GEDEI).

The available location EMT management unit GED in fact manages two separate subsets of available locations EMT (for example using two chained lists in a common memory addressed using EMTs), namely a first subset of available locations EMT having both associated identifiers (IBD-A and IBD-B) free and a second subset of available locations EMT having only one associated identifier (IBD-A or IBD-B) free. Dividing management into two separate subsets in this way enables preference to be given to selecting an available EMT in the first subset for a new BD if it becomes cleared for elimination, in the event of normal BD reception, so that it can be eliminated afterwards, if necessary, for BD reception with substitution (which will only be possible if there remains an available identifier value for that EMT).

The EMT/IBD availability status management unit GEDEI provides the functions of the previous units GIL 9, GAEI 3 and GAIE 11 and manages the three status bits IEMT, IIA and IIB in the memory for each address EMT. Accordingly, in a variant of this kind, the function of managing the free identifier values IBD-A and IBD-B associated with a location EMT is simply based on the value of the corresponding status bits IIA and IIB, and the function of managing the relations between EMT and IBD is simplified by the coding used for the identifier values based on the corresponding location EMT.

What is claimed is:

1. A buffer memory management system, each location of said memory being able to store a data block at a location address, and a reference referred to as a data block identifier being associated with each block processed by said system, which system includes:

time management means (UGT1) for data blocks stored in the buffer memory, for:

commanding reception of a new data block to be stored in the buffer memory;

arranging the identifiers of the data blocks stored in the buffer memory in accordance with a given service discipline, by managing, as a function of time parameters associated with the identifiers of said blocks, their respective waiting times in the buffer memory and thereby determining their respective read times for service, each data block having normally to be read a predetermined number of times before freeing its location in the buffer memory and its associated block identifier;

commanding service of a data block to read in the buffer memory; and possibly commanding premature elimination of a predetermined stored data block, freeing of its location in the memory and temporary preservation of its associated block identifier to prevent rearrangement of the time relations between blocks;

free buffer memory location address management means (GEL) for searching for a free location address in the event of receiving a new data block to be stored in said buffer memory and freeing the address of a location when it is no longer occupied by a data block;

free data block identifier management means (GIL) for assigning a free block identifier to each new data block stored in the buffer memory and freeing the identifier associated with a data block when it is no longer used for that block;

write control means (UCE) for writing a new data block in a location of the buffer memory;

read control means (UCL) for reading the buffer memory in the event of service of a data block;

location/block identifier association management means (GAIE) for storing, for each identifier associated with a data block, the address of the location that it occupies in the buffer memory; and elimination flag management means (GIE) for storing, for each data block identifier, an elimination flag indicating whether the corresponding block has been eliminated prematurely or not, said elimination flag relating to a data block being marked in the event of premature elimination of that block, the presence or absence of said elimination flag relating to a data block being detected in the event of service of that block in order to read it in the buffer memory, reading of said block being authorized only if said elimination flag corresponding to said block identifier indicates that said block has not already been eliminated, and freeing of the address of the location corresponding to said block after said block has been read a predetermined number of times being authorized only if said block has not already been eliminated;

characterized in that:

the stored data blocks are managed in accordance with a plurality of categories, each block belonging to a given category;

said system further includes:

category marking management means (GMC) for storing a category to which each data block belongs; and blocks cleared for elimination management means (GBDCE) for storing, for each category, a list of the data blocks cleared for elimination belonging to that category; and to enable further the elimination of a data block cleared for elimination from among all the data blocks belonging to a specified category:

said category marking management means (GMC) effect marking of the category (CAT-BR) of a data block in the event of reception of a new data block and reading to identify the category (CAT-S; CAT-ED) of a data block in the event of the last service of a data block that has not already been eliminated or in the event of premature elimination of a predetermined data block; and said blocks cleared for elimination management means (GBDCE) add, in the event of the reception of a data block, a new data block to the list of data blocks cleared for elimination that corresponds to the priority category (CAT-BR) of said new block, and delete a data block from its list of data blocks cleared for elimination:

either in the event of the last service of a data block that has not already been eliminated or in the event of premature elimination of a predetermined data block, in which case said block is known and its list corresponds to the category (CAT-S; CAT-ED) identified for said block by said category marking management means (GMC);

or in the event of elimination of a data block cleared for elimination in a specified priority category (CAT-BEP), in which case said blocks cleared for elimination management means (GBDCE) select one of the blocks from the list corresponding to said category and then indicate to said elimination flag management means (GIE) which block has been selected in order for said means to mark the elimination flag storing the elimination of said block.

2. A buffer memory management system according to claim 1, characterized in that:

the data blocks cleared for elimination management means (GBDCE) and the category marking management means (GMC) address said data blocks by means of their data block identifier (IBD); and in the event of elimination of a data block cleared for elimination in a specified priority category (CAT-BEP), the data blocks cleared for elimination management means (GBDCE) transmit the identifier of the data block selected for elimination:

to the location/block identifier association management means (GAIE), which then determine the corresponding location address occupied by said data block selected for elimination; and directly as an address of the memory of said elimination flag management means (GIE) in order for said means to mark the elimination flag storing the elimination of said block.

3. A buffer memory management system according to claim 1, characterized in that:

the data blocks cleared for elimination management means (GBDCE) and the category marking management means (GMC) address said data blocks by means of their location address (EMT) in the buffer memory;

the system further includes additional identifier/block location association management means (GAEI) for storing, for each location address (EMT) occupied by a data block in the buffer memory, the identifier (IBD) associated with said block, said identifier being stored at an address corresponding to that of the location occupied by said block in the buffer memory; and in the event of elimination of a data block cleared for elimination in a specified priority category (CAT-BEP), the data blocks cleared for elimination management means (GBDCE) transmit the location address (EMT-EP) of the data block selected for elimination to said additional identifier/block location association management means (GAEI) which then determine the corresponding identifier (IBD-EP) of the data block selected for elimination and then supply said data block identifier as an address of the memory of said elimination flag management means (GIE) in order for said means to mark the elimination flag storing the elimination of said block.

4. A buffer memory management system according to claim 2, characterized in that, for isolated elimination of a data block cleared for elimination belonging to a specified data block category, the location address (EMT-EP) occupied by the data block selected for elimination, determined by the location/block identifier association management means (GAIE), is supplied to the free buffer memory location address management means (GEL) in order for said means to free the location (EM-TEP) occupied by said block in the buffer memory.

5. A buffer memory management system according to claim 3, characterized in that, for isolated elimination of a data block cleared for elimination belonging to a specified data block category, the location address (EMT-EP) occupied by the data block selected for elimination by the data blocks cleared for elimination management means (GBDCE) is also supplied directly to the free buffer memory location address management means (GEL) in order for said means to free the location (EM-TEP) occupied by said block in the buffer memory.

6. A buffer memory management system according to claim 1, for executing a process of reception of a new data block with data block substitution, said process consisting of immediately eliminating a data block cleared for elimination belonging to a specified data block category in order to be able to store the new data block received, characterized in that:
  the location address (EMT-EP) in the buffer memory of the data block eliminated is used in this case as a free location address (EMT-R) for storing the new data block received in the buffer memory, said address (EMT-R) being supplied:
    to the write control means (UCE) in order for said means to write the new data block at that location address; and
    to the location/block identifier association management means (GAIE) in order for said means to store, for the block identifier assigned to said new data block, the address of the location (EMT-R) used to store the data block received;
    the free data block identifier management means (GIL) assign a block identifier (IBD-R) to the new data block received and supply that identifier:
      to the time management means (UGT1) of the data blocks stored in the buffer memory;
      to the location/block identifier association management means (GAIE) in order for said means to store, for the block identifier (IBD-R) assigned to said new data block, the address of the location (EMT-R) used to store the data block received; and
      to the elimination flag management means (GIE) in order for said means to initialize the elimination flag of the new block received to the non-eliminated state;
    said category marking management means (GMC) mark the category (CAT-BR) of the new data block received; and
    said data blocks cleared for elimination management means (GBDCE) add said new data block to the list of data blocks cleared for elimination that corresponds to the priority category (CAT-BR) of the new data block received.

7. A buffer memory management system according to claim 6, characterized in that:
  the blocks of date cleared for elimination management means (GBDCE) and the category marking management means (GMC) address said data blocks by means of their data block identifier (IBD); and
  in the event of elimination of a data block cleared for elimination in a specified priority category (CAT-BEP), the data blocks cleared for elimination management means (GBDCE) transmit the identifier of the data block selected for elimination:
    to the location/block identifier association management means (GAIE) which then determine the corresponding location address occupied by said data block selected for elimination; and
    directly as an address of the memory of said elimination flag management means (GIE) in order for said means to mark the elimination flag storing the elimination of said block; and in that, to execute said reception of a new data block with substitution:
      the free data block identifier management means (GIL) also supply the identifier (IBD-R) assigned to the data block received:
        to the category management means (GMC) in order for said means to mark the category (CAT-BR) of the new data block received; and
        to the data blocks cleared for elimination management means (GBDCE) in order for said means to add said new data block to the list of data blocks cleared for elimination that corresponds to the priority category (CAT-BR) of the new data block received; and
      the location address (EMT-EP) used to store the new block received is determined by the location/block identifier association management means (GAIE) from the identifier of the block eliminated supplied by the data blocks cleared for elimination management means (GBDCE).

8. A buffer memory management system according to claim 6, for executing said process of reception of a new data block with data block substitution, characterized in that:
  the blocks of date cleared for elimination management means (GBDCE) and the category marking management means (GMC) address said data blocks by means of their location address (EMT) in the buffer memory;
  the system further includes additional identifier/block location association management means (GAEI) for storing, for each location address (EMT) occupied by a data block in the buffer memory, the identifier (IBD) associated with said block, said identifier being stored at the address corresponding to that of the location occupied by said block in the buffer memory; and
  in the event of elimination of a data block cleared for elimination in a specified priority category (CAT-BEP), the data blocks cleared for elimination management means (GBDCE) transmit the location address (EMT-EP) of the data blocks selected for elimination to said additional identifier/block location association management means (GAEI) which then determine the corresponding identifier (IBD-EP) of the data block selected for elimination and then supply that data block identifier as an address of the memory of said elimination flag management means (GIE) in order for said means to mark the elimination flag storing the elimination of said block; and the free data block identifier management means (GIL) also supply the identifier (IBD-R) assigned to the data block received to the additional identifier/block location association management means (GAEI) in order for said means to store, for the buffer memory location in which the new block received is written, its associated identifier (IBD-R); and the location address (EMT-EP) used to store the new data block received is selected by the data blocks cleared for elimination management means (GBDCE).

9. A buffer memory management system according to claim 1, characterized in that the free data block identifier management means (GIL) and the location/block identifier association management means (GAIE) use a common memory including a memory line for each possible data block identifier (IBD), each line of common memory being used exclusively for one or the other of said two types of management means and containing:

either the next block identifier (IBD) in the chained list of free block identifiers if the block identifier corresponding to said common memory line is free and managed by the free data block identifier management means (GIL);

or the address of the location (EMT) of the buffer memory at which is stored a data block having an associated block identifier (IBD) corresponding to said common memory line, when said identifier is used and managed by the location/block identifier association management means (GAIE).

10. A buffer memory management system according to claim 3, characterized in that the free buffer memory location address management means (GEL) and the additional identifier/block location association management means (GAEI) use a common memory including a memory line for each possible location address (EMT) in the buffer memory, each common memory line being used exclusively by one or the other of said two types of management means and containing:

either the next location address (EMT) in the chained list of free memory locations if the location corresponding to said common memory line is free and managed by the free buffer memory location address management means (GEL);

or the block identifier (IBD) associated with a data block stored in the buffer memory at the location address (EMT) corresponding to said common memory line in the event that said location is occupied and managed by the additional identifier/block location association management means (GAEI).

11. A buffer memory management system according to claim 1, characterized in that the data blocks cleared for elimination management means (GBDCE) manage the various lists of data blocks cleared for elimination using a chained list for each category and in that said means use a common memory (22) including a memory line for each possible data block reference, each line of said common memory being used exclusively by not more than one of said lists for each category and containing the reference of the next block, if any, and the reference of the preceding block, if any, in the chained list of data blocks cleared for elimination corresponding to said category.

12. A buffer memory management system according to claim 11, characterized in that said data blocks references used for addressing said common memory (22) are data block identifiers and:

the data blocks cleared for elimination management means (GBDCE) and the category marking management means (GMC) address said data blocks by means of their data block identifier (IBD); and in the event of elimination of a data block cleared for elimination in a specified priority category (CAT-BEP), the data blocks cleared for elimination management means (GBDCE) transmit the identifier of the data block selected for elimination:

to the location/block identifier association management means (GAIE) which then determine the corresponding location address occupied by said data block selected for elimination; and directly as an address of the memory of said elimination flag management means (GIE) in order for said means to mark the elimination flag storing the elimination of said block.

13. A buffer memory management system according to claim 11, characterized in that said data block references used for addressing said common memory (22) are buffer memory locations and:

the data blocks cleared for elimination management means (GBDCE) and the category marking management means (GMC) address said data blocks by means of their location address (EMT) in the buffer memory;

the system further includes additional identifier/block location association management means (GAEI) for storing, for each location address (EMT) occupied by a data block in the buffer memory, the identifier (IBD) associated with said block, said identifier being stored at the address corresponding to that of the location occupied by said block in the buffer memory; and in the event of elimination of a data block cleared for elimination in a specified priority category (CAT-BEP), the data blocks cleared for elimination management means (GBDCE) transmit the location address(EMT-EP) of the data block selected for elimination to said additional identifier/block location association management means (GAEI) which then determine the corresponding identifier (IBD-EP) of the data block selected for elimination and then supply said data block identifier as an address of the memory of said elimination flag management means (GIE) in order for said means to mark the elimination flag storing the elimination of said block.

14. A buffer memory management system according to claim 1, characterized in that, in the event of elimination of a data block cleared for elimination in a specified category (CAT-BEP), said blocks cleared for elimination management means (GBDCE) select the first data block from the list of blocks cleared for elimination corresponding to said specified category.

* * * * *